United States Patent
Asai et al.

(10) Patent No.: US 6,760,765 B1
(45) Date of Patent: Jul. 6, 2004

(54) CLUSTER SERVER APPARATUS

(75) Inventors: Rieko Asai, Hirakata (JP); Takeshi Omura, Kanzaki-gun (JP); Masaki Horiuchi, Hirakata (JP)

(73) Assignee: Matsushita Electric Industrial Co., Ltd., Osaka-fu (JP)

( * ) Notice: Subject to any disclaimer, the term of this patent is extended or adjusted under 35 U.S.C. 154(b) by 630 days.

(21) Appl. No.: 09/692,545

(22) Filed: Oct. 20, 2000

(30) Foreign Application Priority Data

Nov. 9, 1999 (JP) ............................................ 11/318318
Oct. 4, 2000 (JP) ...................................... 2000/304433

(51) Int. Cl.[7] ........................ G06F 15/173; G06F 15/16
(52) U.S. Cl. ........................ 709/226; 709/229; 709/219; 709/203; 709/223; 709/231; 725/115; 725/119; 714/4
(58) Field of Search ................................ 709/226, 229, 709/219, 203, 223, 231; 725/115, 119; 714/4

(56) References Cited

U.S. PATENT DOCUMENTS

| | | | |
|---|---|---|---|
| 5,511,208 A | | 4/1996 | Boyles et al. |
| 5,687,347 A | * | 11/1997 | Omura et al. ................ 711/112 |
| 6,047,309 A | | 4/2000 | Dan et al. |
| 6,061,504 A | * | 5/2000 | Tzelnic et al. ............... 709/219 |
| 6,205,481 B1 | * | 3/2001 | Heddaya et al. ............ 709/226 |

(List continued on next page.)

FOREIGN PATENT DOCUMENTS

| | | | | |
|---|---|---|---|---|
| EP | 707272 A2 | * | 4/1996 | ........... G06F/17/30 |
| EP | 817421 A2 | * | 1/1998 | ........... H04L/12/00 |
| EP | 1107533 A2 | * | 6/2001 | ........... H04L/29/06 |
| JP | 6-309264 | | 11/1994 | |
| JP | 8-55072 | | 2/1996 | |
| JP | 8-263351 | | 10/1996 | |
| JP | 9-163353 | | 6/1997 | |
| JP | 9-179820 | | 7/1997 | |
| JP | 9-224044 | | 8/1997 | |
| JP | 10-21134 | | 1/1998 | |
| JP | 10-93552 | | 4/1998 | |

(List continued on next page.)

OTHER PUBLICATIONS

Hunt et al., "Network Dispatcher: A Connection Router for Scalable Internet Services," Apr. 1998, Proceedings of the 7th International World Wide Web Conference, from http://www1.cs.columbia.edu/~german/papers.html, pp. 1–13.*

(List continued on next page.)

*Primary Examiner*—Glenton B. Burgess
*Assistant Examiner*—Bradley Edelman
(74) *Attorney, Agent, or Firm*—Wenderoth, Lind & Ponack, L.L.P.

(57) ABSTRACT

A cluster server apparatus operable to continuously carrying out data distribution to terminals even if among a plurality of cache servers of the cluster server apparatus cache server, while optimally distributing loads on the plurality of cache servers. A cluster control unit of the cluster server apparatus distributes requests from the terminals based on the load of each of the plurality of cache servers. A cache server among the plurality of cache servers distributes, requested data (streaming data) to a terminal if the requested data is stored in a streaming data storage unit of the cache server, while distributing data from a content server the requested data if it is not stored in the streaming data storage unit. The data distributed from the content server is redundantly stored in the respective streaming data storage units of two or more cache servers. One cache server detects the state of distribution of the other cache server that stores the same data as that stored in the one cache server. If the one cache server becomes unable to carry out distribution, the other cache server continues data distribution instead.

41 Claims, 16 Drawing Sheets

U.S. PATENT DOCUMENTS

| | | | | |
|---|---|---|---|---|
| 6,311,216 B1 | * | 10/2001 | Smith et al. | 709/226 |
| 6,324,182 B1 | * | 11/2001 | Burns et al. | 370/429 |
| 6,324,580 B1 | * | 11/2001 | Jindal et al. | 709/228 |
| 6,370,620 B1 | * | 4/2002 | Wu et al. | 711/132 |
| 6,389,462 B1 | * | 5/2002 | Cohen et al. | 709/218 |
| 6,396,805 B2 | * | 5/2002 | Romrell | 370/216 |
| 6,425,130 B2 | * | 7/2002 | Asai et al. | 725/91 |
| 6,463,508 B1 | * | 10/2002 | Wolf et al. | 711/133 |
| 6,490,615 B1 | * | 12/2002 | Dias et al. | 709/219 |
| 2002/0026560 A1 | * | 2/2002 | Jordan et al. | 711/120 |

FOREIGN PATENT DOCUMENTS

| | | |
|---|---|---|
| JP | 11-25059 | 1/1999 |
| JP | 11-224219 | 8/1999 |
| JP | 11-249977 | 9/1999 |
| JP | 2002-527818 | 8/2002 |
| WO | 00/22526 | 4/2000 |

OTHER PUBLICATIONS

Wu et al., "Load Balancing and Hot Spot Relief for Hash Routing Among a Collection of Proxy Caches," Jun. 1999, Proceeding of the $19^{th}$ IEEE International Conference on Distributed Computing Systems, 1999, pp. 536–543.*

Birk, "Random RAIDs with Selective Exploitation of Redundancy for High Performance Video Servers," May 1997, Proceedings of the IEEE $7^{th}$ International Worshop on Network and Operating System Support for Digital Audio and Video, 1997, pp. 13–23.*

Shyu et al., "Balancing Workload and Recovery Load on Distributed Fault–Tolerant VOD Systems," Oct. 1998, IEEE Communications Letters, vol. 2, Issue 10, pp. 288–290.*

* cited by examiner

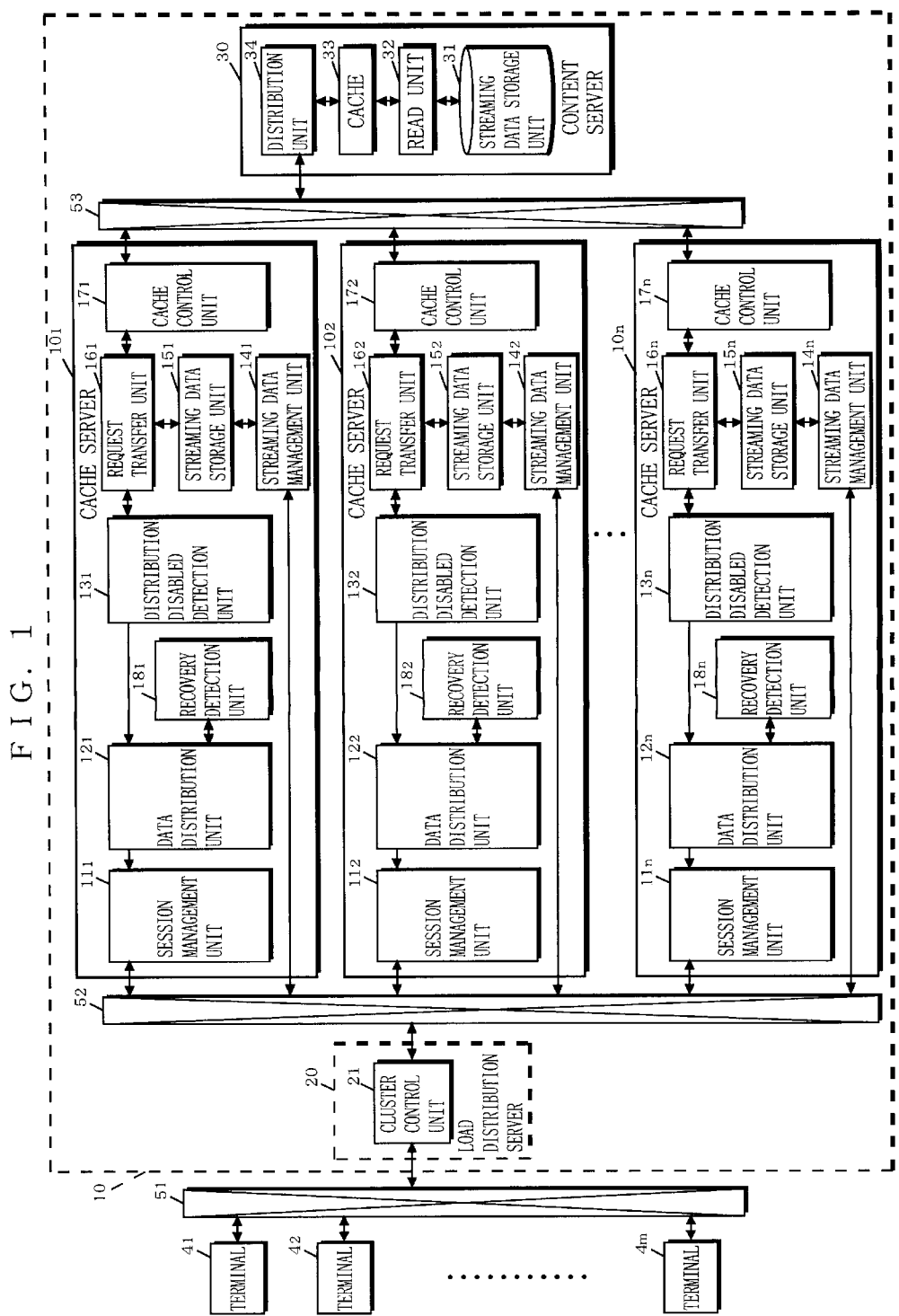
F I G. 1

FIG. 4

| STREAMING DATA | CACHE BLOCK NO. | ACCESS TIME |
|---|---|---|
| data1 | 11xx1~11yy2 | xx:xx:xx |
| data32 | 123xx2~11yy3 | xx:xx:xx |
| data13 | 0001x~000yz | xx:xx:xx |
| data24 | xxxxx~122xxx | xx:xx:xx |
| data104 | 8900xx~8901xx | xx:xx:xx |
| ...... | ...... ...... | ...... |

FIG. 5

| TERMINAL ADDRESS | SESSION NO. | DISTRIBUTED DATA NO. | SEQUENCE NO. |
|---|---|---|---|
| 192.168.1.11 | 10002 | xxxxx | 2 |
| 192.168.1.12 | 10013 | yyyyy | 11 |
| 192.168.1.52 | 10015 | zzz | 21 |
| 192.168.1.31 | 10220 | yyyyy | 19 |
| ...... | ...... | ...... | ...... |
| 192.168.1.21 | 11011 | xxxxx | 28 |

FIG. 6

| CACHE SERVER | CACHE | THE NUMBER OF DISTRIBUTION STREAMS 1 | THE NUMBER OF DISTRIBUTION STREAMS 2 |
|---|---|---|---|
| 1 | × | 100 | 500 |
| 2 | ○ | 120 | 1000 |
| 3 | ○ | 10 | 500 |
| 4 | × | 150 | 200 |
| ...... | ...... | ...... | ...... |
| n | × | 200 | 500 |

CLUSTER SERVER APPARATUS

BACKGROUND OF THE INVENTION

1. Field of the Invention

The present invention relates to cluster server apparatuses, and more specifically, to a cluster server apparatus for distributing streaming data such as video data in response to requests from a plurality of terminals connected to the cluster server apparatus through a network.

2. Description of the Background Art

For cluster server apparatuses that distribute streaming data typified by video data, continuous distribution of the streaming data to terminals connected to the cluster server apparatuses through a network is required. Since the volume of the streaming data is generally enormous, a storage device such as a large-capacity hard disk is used for data storage in the cluster server apparatus.

However, in the cluster server apparatus structured by a server comprising a large-capacity storage device for data storage, the number of terminals for receiving data is restricted by the capability limitations of the server. Therefore, in one conventional method for distribution of streaming data to a plurality of terminals, a plurality of servers are provided in the cluster server apparatus, and requests from the terminals are distributed in rotation among the plurality of servers.

An example of the structure of a conventional cluster server apparatus using the above-described method of distributing requests in rotation among the plurality of servers is briefly described below.

FIG. 18 is a block diagram showing an example of the structure of a distribution system using the above-described conventional cluster server apparatus.

As shown in FIG. 18, m terminals $40_1$ to $40_m$ (where m is an integer not less than 2) and a cluster server apparatus 200 are connected together via a network 501 in the conventional distribution system. The cluster server apparatus 200 is structured by n cache servers $20_1$ to $20_n$ (where n is an integer not less than 2) and a content server 300. The cache servers $20_1$ to $20_n$ are each connected to the content server 300 via an internal network 503.

The cache servers $20_1$ to $20_n$ include receivers $21_1$ to $21_n$, caches $22_1$ to $22_n$, and distribution units $23_1$ to $23_n$, respectively. The content server 300 includes a streaming data storage unit 301, a read unit 302, a cache 303, and a distribution unit 304. Stream data is stored in the streaming data storage unit 301 as packets, where packets are a unit of the streaming data.

Now assume that the terminal $40_1$ requests the content server 300 for certain streaming data. In response to the request, the read unit 302 issues a read request for the streaming data to the streaming data storage unit 301 in the content server 300. The streaming data, in response to the read request, is then read in the read unit 302. The read streaming data is cached in the cache 303. The distribution unit 304 sends the streaming data which is cached in the cache 303 to the cash server $20_1$. In the cash server $20_1$, the receiver $21_1$ receives the streaming data sent from the content server 300. The received streaming data is cached in the cache $22_1$ of the cache server $20_1$. The distribution unit $23_1$ sends the streaming data cached in the cache $22_1$ to the terminal $40_1$.

Next, when the terminal $40_2$ requests the content server 300 for certain streaming data, the cluster server apparatus 200 uses the cache server $20_2$, and when the terminal $40_3$ requests the content server 300 for certain streaming data, the cluster server apparatus 20 uses the cache server $20_3$. In this way, the cluster server apparatus 200 uses the cache servers in rotation as the cluster server apparatus 200 receives multiple requests from the terminals.

As stated above, in the conventional cluster server apparatus 200, the cache servers $20_1$ to $20_n$ are structured in parallel for cyclical use in handling requests. With this structure, the number of terminals $40_1$ to $40_m$ for receiving streaming data is increased in the entire system.

In addition to the above, another conventional cluster server apparatus which caries out a data recovery after recovery from a failure which occurred in one server in the cluster server apparatus has been disclosed in Japanese Patent Laid-Open Publication No. 8-263351 (1996-263351). In the conventional cluster server apparatus disclosed in this publication, each cache server caches on updating history of the content server. After failure recovery, the latest updating history cached in the cache server is used for data recovery in the content server. Therefore, even if a failure occurs in the data of the content server, data recovery can be quickly carried out in this conventional cluster server apparatus without requiring system suspension.

However, in the conventional cluster server apparatus 200, requests from the terminals $40_1$ to $40_m$ are provided to the cache servers $20_1$ to $20_n$ simply in rotation. Therefore, if streaming data that is continuous in time such as video data is to be distributed, loads on the cache servers $20_1$ to $20_n$ are not properly distributed, and thereby continuous video images may be interrupted.

Further, if a failure occurs in the cache server during streaming data distribution, another server has to distribute the streaming data from the start of the streaming data instead of the portion of the streaming data which remains to be transmitted when the failure occurred.

Still further, in the conventional cluster server apparatus disclosed in the above publication, the updating history of the content server is held only by the cache servers. Therefore, if any failure occurs in the cache servers, the service to the terminals is thereby interrupted.

SUMMARY OF THE INVENTION

Therefore, an object of the present invention is to provide a cluster server apparatus for optimally distributing, in response to requests from terminals, loads on cache servers while continuing, even if a failure occurs in any one of the cache servers, data distribution to the terminals without any problem (frame skip) and for recovering from the failure.

The present invention has the following features to achieve the object above.

The present invention is directed to a cluster server apparatus for distributing streaming data such as moving-picture data continuously in time in response to requests from a plurality of terminals connected to the cluster server apparatus through a network.

First, in order to achieve load-distribution among cache servers, the present invention comprises a plurality of cache servers which are each operable to distribute the streaming data corresponding to the requests from the terminals, and a load-distribution server which is operable to receive the request from one of the terminals and to transfer the request to one of the plurality of cache servers based on whether streaming data that corresponds to the request is stored in the cache servers or not and the state of the distribution of streaming data by the cache servers, and a content server with a streaming data storage unit which is operable to store the streaming data, where the content server is operable to send, to the cache server, the streaming data that corresponds to the request from the cache server. Each of the cache servers comprises a streaming data storage unit which is operable to store the streaming data from the content server, and a request transfer unit which is operable to receive the request transferred from the load-distribution server. If the streaming data which corresponds to the request is stored in the streaming data storage unit, the request transfer unit is operable to output an instruction for distributing the stored streaming data. If, however, the streaming data which corresponds to the request is not stored the streaming data storage unit, the request transfer unit is operable to transfer the request to the content server, to store the streaming data from the content server in the steaming data storage unit, and to output an instruction for distributing the stored streaming data. Each of the cache servers also comprise a data distribution unit which is operable to distribute the streaming data stored in the streaming data storage unit to the requesting terminal based on the instruction outputted from the request transfer unit, and a cache control unit which is operable to control the streaming data from the content server to be redundantly stored in the streaming data storage unit of at least one other predetermined cache servers.

Preferably, each of the cache servers further comprises a session management unit which is operable to manage the state of streaming data distribution by its own cache server, and a streaming data management unit which is operable to manage the streaming data stored in the streaming data storage unit.

The load-distribution server of the present invention comprises a cluster control unit which is operable to, when receiving the request from the terminal, make an inquiry to all of the session management units and all of the streaming data management units of the plurality of cache servers. The inquiry requests information concerning the distribution state in the cache servers and whether the streaming data that corresponds to the request is stored or not. Based on a response to the inquiry from any one of the cache servers, the load-distribution is operable to transfer the request to any one of the responding cache servers. If any of the cache servers store the corresponding streaming data, the cluster control unit of the load-distribution server transfers the request to a least-loaded cache server among the cache servers that store the corresponding streaming data. If however, none of the cache servers store the corresponding streaming data, the cluster control unit transfers the request to a least-loaded cache server among all of the cache servers.

Alternatively, it is preferred that each of the cache servers further comprises a session management unit which is operable to manage a state of streaming data distribution by its own cache server, and a streaming data management unit operable to manage the streaming data stored in the streaming data storage unit. It is also preferred that the load-distribution server comprises a load state management unit which is operable to always communicate with the session management units of all of the cache servers and to hold states of the load on each of the cache servers, and a cluster control unit which is operable to, when receiving the request from the terminal, make an inquiry to all of the streaming data management units as to whether the streaming data that corresponds to the request is stored or not. Based on a response to this inquiry, the load-distribution server is operable to transfer the request to any one of the cache servers. Based on information in the load state management unit, if any of the cache servers store the corresponding streaming data, the cluster control unit of the load-distribution system transfers the, request to a least-loaded cache server among the cache servers that store the corresponding streaming data. If, however, none of the cache servers store the corresponding streaming data, the cluster control unit transfers the request to a least-loaded cache server among all of the cache servers.

Alternatively, it is preferred that each of the cache servers comprises a session management unit which is operable to manage a state of stream distribution by its own cache server, and a streaming data management unit which is operable to manage the streaming data stored in the streaming data storage unit. It is also preferred that the load-distribution server comprises a cluster control unit which is operable to always communicate with the session management units and all of the streaming data management units and, based on the communication, to transfer the request to any one of the cache servers. Upon receiving the request from the terminal, if any of the cache servers store the corresponding streaming data, the cluster control unit transfers the request to a least-loaded cache server among the cache servers that store the corresponding streaming data. If, however, none of the cache servers store the corresponding streaming data, the control unit transfers the request to a least-loaded cache server among all of the cache servers.

Here, if the cluster server apparatus comprises first to n-th cache servers (where n is an integer not less than 2), when the streaming data is stored in the streaming data storage unit, the cache control unit of an i-th cache server controls the streaming data to be stored in the streaming data storage units of an (i+1)-th cache server (where I is any number from 1 to n, and if i=n, a first cache server).

It is also preferred that when the streaming data which corresponds to the request is not stored in the streaming data storage unit, the cache control unit changes a sender address of the request to be transferred to the content server into a predetermined multicast address for transmission. Further, when receiving the streaming data destined for the predetermined multicast address, the cache control unit controls the streaming data to be stored in the streaming data storage unit.

Further, it is preferred that, in the i-th cache server, when the streaming data which corresponds to the request is not stored in the streaming data storage unit, the cache control unit of the i-th cache server transmits, to the content server, the request for streaming data distribution to addresses of the i-th cache server and the (i+1)-th cache server.

It is also preferred that the cluster control unit transfers the requests to the cache servers so that the number of distributable streams for each of the cache servers is equal to or less than a value $\{((n-1)/n) \times MAX\}$ (where MAX is the maximum number of distribution streams that each of the cache servers can distribute), and it is preferred that the total number of distribution streams of the streaming data stored in the streaming data storage units ($15_i$, $15_{i+1}$) of the i-th cache server and the (i+1)-th cache server is equal to or less than MAX.

It is also preferred that the cluster control unit transfers the requests to the cache servers so that the total number of distribution streams of the streaming data stored in the streaming data storage units of the i-th cache server and the (i+1)-th cache server is equal to or less than MAX, and it is preferred that the total number of distribution streams of the streaming data stored in the streaming data storage units of the (i−1)-th cache server (if i=1, the n-th cache server) and the i-th cache server is equal to or less than MAX.

As described above, according to the present invention, one streaming data is stored in the plurality of cache servers. Therefore, the streaming data can be directly distributed from the plurality of cache servers, and the distribution capabilities of the cache servers can thereby be greatly improved. Moreover, equal load-distribution of the cache servers can be achieved according to the volume of streaming data stored in each of the cache servers. Thus, the storage units (caches) can be efficiently used, and data can be distributed to more terminals.

Further, the present invention preferably has the following features to achieve continuous data distribution by using other cache servers when one of the cache servers becomes unable to carry out distribution.

The data distribution unit of each of the cache servers notifies the other cache server which redundantly stores the streaming data of distribution information about the streaming data being distributed to the terminal at regular intervals. Each of the cache servers further comprises a distribution-disabled detection unit which is operable to detect, through the distribution information received from the other cache server, that at least one of the other cache servers becomes unable to carry out distribution i.e., at least one of the other cache servers has failed. The distribution-disabled detection of at least one of the non-failing cache servers then provides an instruction to the data distribution unit to distribute, within a predetermined period for avoiding interruption of the streaming data, the streaming data that succeeds the streaming data most recently distributed by the other cache server which has failed and has thus become unable to carry out distribution, instead of the other cache server which has failed.

It is also preferred that the data distribution unit of the i-th cache server notifies the (i+1)-th cache server and the (i−1)-th cache server which redundantly store the streaming data of distribution information corresponding to the streaming data being distributed to the terminal at regular intervals. It is also preferred that the i-th cache server further comprises a distribution-disabled detection unit which is operable to detect, through the distribution information received from the (i+1)-th cache server and the (i−1)-th cache server, whether either or both of the (i+1)-th cache server or the (i−1)-th cache server have become unable to carry out distribution, and to provide an instruction to the data distribution unit to distribute, within a predetermined period for avoiding interruption of the streaming data, the streaming data that succeeds the streaming data most recently distributed by the either or both of the cache servers that have become unable to carry out distribution instead of the failed cache servers.

Further, it is preferred that when the data distribution unit distributes the streaming data to the terminal instead of the cache server that becomes unable to carry out distribution by following the instruction provided by the distribution-disabled detection unit, the cache control unit controls new streaming data from being stored in the streaming data storage unit of the cache server which distributes the streaming data instead of the failed cache server.

As described above, according to the present invention, one streaming data is stored in the plurality of cache servers. Also, the cache servers operate while notifying each other of their states of distribution. Thus, in addition to the effects already mentioned above, the present invention has an effect that continuous data distribution to the terminals can be made even when a failure occurs.

Still further, the present invention has the following features to achieve data recovery to the cache server which has recovered from a failure.

When the cache server that becomes unable to carry out distribution is recovered, the recovered cache server outputs a recovery notification to the data distribution unit of the other cache server that redundantly stores the streaming data. When the other cache server which has distributed the streaming data to the terminal instead of the recovery cache server receives the recovery notification, the other cache server copies the streaming data stored in its streaming data storage unit to the streaming data storage unit of the recovered cache server.

As described above, according to the present invention, one streaming data is stored in the plurality of cache servers. Also, the cache servers operate while notifying each other of their states of distribution. Thus, quick data recovery can be made to the cache server that has been recovered after it has failed.

Still further, the present invention preferably has the following features to achieve continuous data distribution using other cache servers when one of the cache servers becomes unable to carry out distribution.

Each of the cache servers further comprises a session management unit which is operable to manage a session, which indicates the execution of distributing the streaming data to the terminal through the network connection, a packet (a unit of streaming data) most recently transmitted by the data distribution unit in each session, and the number of distribution streams of the streaming data. Each of the cache servers further comprises a distribution-disabled detection unit operable to regularly transmit to and receive from the other cache servers that redundantly store the streaming data a notification corresponding to the packets for all sessions managed by the session management unit. When one of the cache servers ceases to send the notification for a predetermined time period, the distribution-disabled detection unit determines that the cache server that ceases to send the notification becomes unable to carry out distribution. Then, the distribution-disabled detection unit provides an instruction to the data distribution unit that the cache server, which redundantly stores the streaming data, to distribute, within a predetermined period for avoiding interruption of the streaming data, a packet that succeeds the packet identified by the notification most recently received for sessions of the redundantly-stored streaming data among sessions managed by the other cache server that becomes unable to carry out distribution instead of the cache server which has become unable to carry out distribution.

Alternatively, it is preferred that each of the cache servers further comprises a session management unit which is operable to manage a session identifier for identifying a session, which indicates the execution of distributing the streaming data to the terminal through the network connection, a packet identifier for identifying a packet (a unit of streaming data) most recently transmitted by the data distribution unit for each session, a session management table for storing the session identifier and the packet identifier, a table boundary value for dividing the session management table into two based on the session identifier, and the number of distribution streams of the streaming data. It is also preferred that each of the cache servers further comprises a distribution-disabled detection unit which is operable to regularly transmit to and receive from the other cache servers that redundantly store the streaming data a notification corresponding to the session identifiers and the packet identifiers for all sessions in which the streaming data managed by the session management unit are being distributed, and to update, according to the notification received by the other cache servers, the session identifier and the packet identifier stored in the session management table. The session management unit is operable to set the session identifier of the session for the streaming data being distributed by the data distribution unit of its own cache server to a value equal to or smaller than the table boundary value, and to set the session identifier of the session for the streaming data being distributed by the data distribution unit of the other cache server to a value larger than the table boundary value. The data distribution unit is operable to repeatedly distribute the packet to the terminal and to update the packet identifier when the session identifier is equal to or smaller than the table boundary value in all of the sessions. When one of the cache servers ceases to send the notification for a predetermined time period, the distribution-disabled detection unit determines that the cache server that ceases to send the notification becomes unable to carry out distribution. Upon such a determination, the distribution-disabled detection unit sets the table boundary value to a value larger than a maximum value of the session identifier within a predetermined period so as to avoid interruption of the streaming data.

Alternatively, it is preferred that each of the cache servers further comprises a session management unit which is operable to manage the number of distribution streams of the streaming data distributed from its own cache server, and a distribution-disabled detection unit which is operable to detect the other cache server that becomes unable to carry out distribution and to instruct the data distribution unit to start distributing all streaming data that has been distributed by the other cache server instead. The distribution-disabled detection unit is operable to provide an overflow notification to still another cache server that redundantly stores the streaming data, and to instruct the data distribution unit to stop distributing streaming data that exceeds the maximum number of permissible distribution streams. The distribution-disabled detection unit in the still other cache server that has received the overflow notification is operable to instruct the data distribution unit of its own cache server to transmit streaming data that succeeds the streaming data most recently distributed by the cache server that has provided the overflow notification for all streaming data that exceeds the maximum number of permissible distribution streams that the cache server that has provided the overflow notification stops distributing.

It is also preferred that if the other cache server becomes unable to carry out distribution and the response from the session management unit shows that the number of distribution streams exceeds the maximum number of distribution streams that the cache server can distribute, the distribution-disabled detection unit provides the overflow notification to still another cache server that redundantly stores the streaming data, and instructs the data distribution unit to stop distributing streaming data exceeding the maximum number of distribution streams. Further, the distribution-disabled detection unit in the still other cache server that has received the overflow notification instructs the data distribution unit of its own cache server to distribute a packet that succeeds the packet identified by a notification most recently received for streaming data exceeding the maximum number of distribution streams of which the cache server that has provided the overflow notification stops distributing.

It is also preferred that the cache servers that redundantly store the streaming data each have the session management table in which a maximum number of registrable sessions is MAX. Each of the session management units sets the session identifier to a value smaller than the table boundary value for the session of the streaming data being distributed by the data distribution unit of its own cache server, while setting the session identifier to a value not smaller than the table boundary value (setting the session identifiers I1 to In that are smaller than the table boundary value to values (MAX-I1-1) to (MAX-In-1) in the session management table in the other cache server) for the session of the streaming data being distributed by the data distribution unit of the other cache server. The distribution-disabled unit updates, according to the notification, the values in the session management table to the values of the session identifiers (MAX-I1-1) to (MAX-In-1) and the values of the packet identifiers P1 to Pn, and when the table boundary value is changed to F, the distribution-disabled unit sets the table boundary value to (MAX-F).

Further, it is preferred that when a streaming data set S1 stored in both a cache server A and a cache server B and a streaming data set S2 in both the cache server A and a cache server C are stored in the streaming data storage unit of the cache server A. It is also preferred that the cache server A has session management tables T0 and T1 and table boundary values F0 and F1 at which the session management tables T0 and T1 are divided into two based on the session identifier. In the session management table T0, the session identifier is set to a value smaller than the table boundary value F0 for the session of the streaming data included in the streaming data set S1 being distributed by the cache server A, while the session identifier is set to a value larger than the table boundary value F1 (the session identifier having one of the values I1 to In that are smaller than the table boundary value F1 are set to one of values (MAX-I1-1) to (MAX-In-1) in the session management table of the cache server B) for the session of the streaming data included in the streaming data set S1 being distributed by the cache server B. In the session management table T1, the session identifier is set to a value smaller than the table boundary value F1 for the session of the streaming data included in the streaming data set S2 being distributed by the cache server A, while the session identifier is set to a value larger than the table boundary value F0 (the session identifier having one of the values J1 to Jn that are smaller than the table boundary value F1 are set to one of values (MAX-J1 1) to (MAX-Jn-1) in the session management table of the cache server C) for the session of the streaming data included in the streaming data set S2 being distributed by the cache server C.

Further, in the cache server A, the distribution-disabled detection unit is operable to transmit a notification indicating the session identifier and the packet identifier for all sessions of the streaming data being distributed to the cache servers B and C by making an inquiry to the session management unit, and to receive the notification from the cache servers B and C. The distribution-disabled detection unit in the cache server A is also operable to set the table boundary value F0 to a value equal to or larger than MAX when no notification comes from the cache server B, and to set the table boundary value F1 to a value equal to or larger than MAX when no notification comes from the cache server C. When the number of distribution streams exceeds the maximum number of distribution streams, the distribution-disabled detection unit in the cache server A sets the table boundary value F1 to a value smaller than the maximum number of distribution streams if no notification comes from the cache server B, and sets the table boundary value F0 to a value smaller than the maximum number of distribution streams if the notification comes from the cache server C.

As described above, according to the present invention, one streaming data is stored in the plurality of cache servers. Also, the states of distribution of the cache servers adjacent to each other are stored as information in relation to sessions and packets. The cache servers operate while notifying each other of their states of distribution. Thus, in addition to the effects already mentioned above, the present invention has an effect in which continuous data distribution to the terminals can be made even when one of the cache servers becomes unable to carry out distribution.

Still further, the present invention preferably has the following features to achieve data recovery to the cache server that has been recovered after it has failed.

Each of the cache server further comprises a recovery detection unit which is operable to detect that the other cache server that has been unable to carry out distribution has recovered. When the other cache server has recovered, the recovery detection unit of the other recovered cache server is operable to provide a recovery notification to the cache server that takes over distribution of the streaming data to the terminal, and to instruct the data distribution unit to distribute the streaming data that succeeds the streaming data that has been distributed by the cache server. Further, the recovery detection unit of the cache server instructs the data distribution unit to stop the distribution of the streaming data that has been distributed thereby instead of by the recovered cache server.

It is also preferred that each of the cache servers further comprises a distribution recovery unit operable to detect that the other cache server that has been unable to carry out distribution has recovered. When the other cache server has recovered, the cache control unit of the other recovered cache server is operable to provide a recovery notification to the data distribution unit of the cache server that redundantly stores the streaming data, and to copy the streaming data stored in the streaming data storage unit of the cache server that has distributed the streaming data to the terminal instead of the other recovered server to the streaming data storage unit of the other recovered cache server. After the cache control unit completes the copy of the streaming data to the other recovered server, the recovery detection unit of the other recovered cache server is operable to provide a recovery notification to the cache server, and to instruct the data distribution unit to start distributing a packet that succeeds the packet identified by the packet identifier most recently transmitted in the streaming data that has been distributed instead by the cache server. Further, the recovery detection unit of the cache server is operable to instruct the data distribution unit to stop distribution of the streaming data that has been distributed thereby instead of by the recovered cache server.

Alternatively, it is preferred that the cache server further comprises a distribution recovery unit which is operable to detect that the other cache server that has been unable to carry out distribution has recovered. When the other cache server has recovered, the cache control unit of the other recovered cache server is operable to provide a recovery notification to the data distribution unit of the cache server that redundantly stores the streaming data, and to copy the streaming data stored in the streaming data storage unit of the cache server that has distributed the streaming data to the terminal instead of the other recovered cache server to the streaming data storage unit of the other recovered cache server. After the cache control unit completes the copy of the streaming data to the other recovered cache server, the recovery detection unit of the other recovered cache server is operable to provide a recovery notification to the cache server, and to set the table boundary value back to a value that existed before the cache server became unable to carry out distribution. Further, the recovery detection unit of the cache server is operable to set the table boundary value back to the value that existed before the cache server became unable to carry out distribution.

When the cache server carries out distribution of streaming data that exceeds the maximum number of distribution streams because the cache server performed the stream distribution instead of the other cache server that became unable to carry out distribution, it is also preferred that the recovery detection unit of the cache server instructs the data distribution unit to stop distribution of the streaming data that has been distributed thereby instead of by the other recovered cache server, provides a recovery notification to still another cache server, and then instructs the data distribution unit to start distributing streaming data that succeeds the streaming data that has been distributed by the still other cache server. In addition, the recovery detection unit of the still other cache server then instructs the data distribution unit of its own cache server to stop distributing the streaming data that has been distributed thereby instead of by the cache server that provided the recovery notification.

Alternatively, it is preferred that when the cache server carries out distribution of streaming data that exceeds the maximum number of distribution streams because of stream distribution instead of the other cache server that becomes unable to carry out distribution, the recovery detection unit of the cache server instructs the data distribution unit to stop distribution of the streaming data that has been distributed thereby instead of by the other recovered cache server, provides a recovery notification to still another cache server, and then instructs the data distribution unit to start distributing the packet that succeeds the packet identified by the packet identifier most recently transmitted in the streaming data that have been distributed by the still other cache server. In addition the recovery detection unit of the still other cache server instructs the data distribution unit of its own to stop distributing the streaming data that has been distributed thereby instead of the cache server that provided the recovery notification.

It is also preferred that each of the cache servers further comprises a distribution recovery unit operable to detect that the other cache server that has been unable to carry out distribution has recovered. When the other cache server has recovered, the cache control unit of the other recovered cache server is operable to provide a recovery notification to the data distribution unit of the cache server A that redundantly stores the streaming data, and to copy the streaming data stored in the streaming data storage unit of the cache server A that has distributed the streaming data to the terminal instead of the other received cache server to the streaming data storage unit of the other recovered cache server. After the cache control unit completes the copy of the streaming data by providing a recovery notification, the recovery detection unit of the other recovered cache server sets the table boundary value back to a value that existed before the cache server became unable to carry out distribution. Further, after the table boundary value of the cache server is set to the value that existed before the cache server failed, the recovery detection unit of the cache server A sets the table boundary values F0 and F1 back to values before the cache server became unable to carry out distribution.

As described above, according to the present invention, one streaming data is stored in the plurality of cache servers. Also, the states of distribution of the cache servers adjacent to each other are stored as information in relation to sessions and packets. The cache servers operate while notifying each other of their states of distribution. Thus, a quick data recovery can be achieved in the cache server that has recovered after it has failed. This recovery returns the previously failed cache server to the state before it became unable to carry out distribution, and thus, continuous data distribution to the terminals can be achieved even when the same cache server becomes unable to carry out distribution again.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a block diagram showing the structure of a distribution system using a cluster server apparatus according to an embodiment of the present invention.

FIG. 4 is a diagram showing an example of information stored by a streaming data management unit $14_x$.

FIG. 5 is a diagram showing an example of distribution information sent by data distribution units $12_1$ to $12_n$.

FIG. 6 is a diagram showing an example of information for a determination operation performed by a cluster control unit 21.

DETAILED DESCRIPTION OF THE INVENTION

Figure 2:
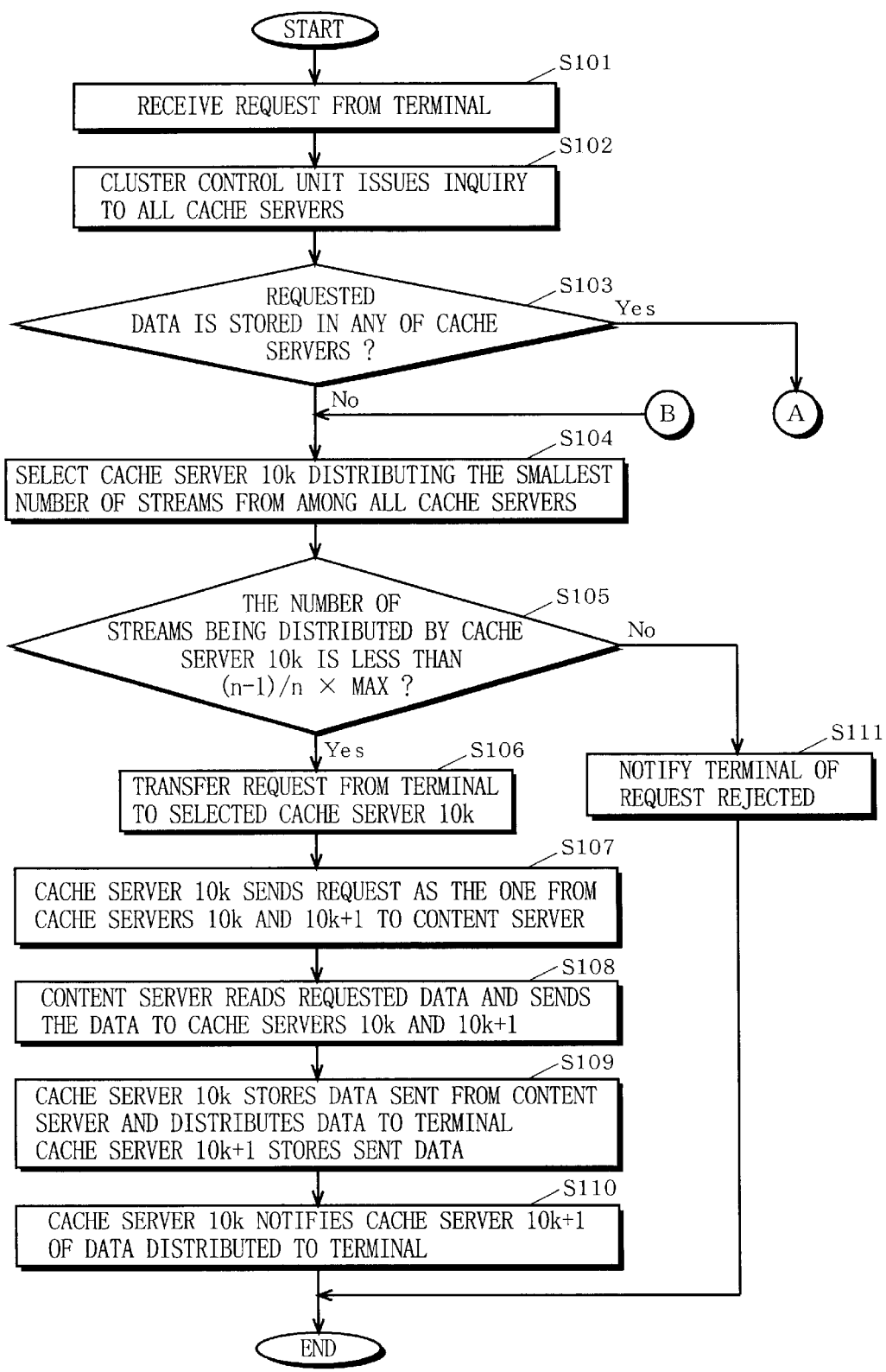
FIGS. 2 and 3 are flowcharts for explaining the operation of distributing streaming data which is performed by a cluster server apparatus 10 according to the embodiment of the present invention.

An embodiment of the present invention is now described with reference to the annexed drawings.

FIG. 1 is a block diagram showing the structure of a distribution system using a cluster server apparatus according to the embodiment of the present invention. In this distribution system, m terminals $4_1$ to $4_m$ (where m is an integer not less than 2) and a cluster server apparatus 10 are connected together via a network 51. The cluster server apparatus 10 includes a load-distribution server 20, n cache servers $10_1$ to $10_n$ (where n is an integer not less than 2), and a content server 30. The cache servers $10_1$ to $10_n$ are each connected to the load-distribution server 20 via an internal network 52 and to the content server 30 via an internal network 53.

The cache servers $10_1$ to $10_n$ include session management units $11_1$ to $11_n$, data distribution units $12_1$ to $12_n$, distribution-disabled detection units $13_1$ to $13_n$, streaming data management units $14_1$ to $14_n$, streaming data storage units $15_1$ to $15_n$, request transfer units $16_1$ to $16_n$, cache control units $17_1$ to $17_n$, and recovery detection units $18_1$ to $18_n$, respectively. The content server 30 includes a streaming data storage unit 31, a read unit 32, a cache 33, and a distribution unit 34. The load-distribution server 20 is structured by a cluster control unit 21.

Note that, as shown in FIG. 1, the cache servers $10_1$ to $10_n$ are structured in the same manner. Therefore, for the purpose of describing a process that may be carried out by any one of the cache servers $10_1$ to $10_n$, it is assumed herein that a cache server $10_x$ (where x is any one of 1 to n) carries out that process. Components included in the cache server $10_x$ are also provided with the subscript x.

The operation of each component in the cluster server apparatus 10 according to the present embodiment is now briefly described.

Upon receiving requests from the terminals $4_1$ to $4_m$ for the streaming data, the cluster control unit 21 transfers these requests to the cache servers $10_1$ to $10_n$ in a manner described later so as to distribute the loads on the cache servers $10_1$ to $10_n$ based on information from the session management units $11_1$ to $11_n$ and the streaming data management units $14_1$ to $14_n$. The cluster control unit 21 is also provided with streaming data outputted from the cache servers $10_1$ to $10_n$, and the cluster control unit 21 distributes the requested streaming data to the corresponding terminals $4_1$ to $4_m$ which requested the streaming data.

In the cache server $10_x$, the session management unit $11_x$ manages the state of streaming data distribution performed by the cache server $10_x$. The data distribution unit $12_x$ outputs the streaming data to the cluster control unit 21 based on an instruction from the request transfer unit $16_x$. The distribution-disabled detection unit $13_x$ detects whether an adjacent cache server $10_{x-1}$ or $10_{x+1}$, which precedes or succeeds the cache server $10_x$ in system management (but not necessarily in a physical sense), becomes unable to carry out distribution of the streaming data. Note that "n" is substituted for "x−1" when x=1, while "1" is substituted for "x+1" when x=n. Hereinafter, the same applies for variables i, j, and k. The recovery detection unit $18_x$ detects that the adjacent cache server $10_{x-1}$ or $10_{x+1}$ is recovered from a distribution-disabled state. The streaming data storage unit $15_x$ is implemented as a RAM (random access memory) to temporarily store the streaming data sent from the content server 30. The streaming data management unit $14_x$ holds information corresponding to the streaming data stored in the streaming data storage unit $15_x$. The request transfer unit $16_x$ determines whether the streaming data requested through the cluster control unit 21 is stored in the streaming data storage unit $15_x$ or not. If the streaming data is stored in the streaming data storage unit $15_x$, the request transfer unit $16_x$ instructs the data distribution unit $12_x$ to provide the cluster control unit 21 with the streaming data stored in the streaming data storage unit $15_x$. If, however, the streaming data is not stored in the streaming data storage unit $15_x$, the request transfer unit $16_x$ instructs the data distribution $12_x$ to provide the cluster control unit 21 with the streaming data obtained through the cache control unit $17_x$ from the content server 30. The cache control unit $17_x$ provides the content server 30 with the request from the request transfer unit $16_x$. The cache control unit $17_x$ controls the streaming data sent from the content server 30 upon request to be stored in the streaming data storage unit $15_{x+1}$ of the cache server $10_{x+1}$ that succeeds the cache server $10_x$ in system management.

In the content server 30, the streaming data storage unit 31 is implemented as a large-capacity hard disk, for example, and stores the streaming data as packets which are units (blocks) of the streaming data. The read unit 32 reads the streaming data from the streaming data storage unit 31 based on an instruction from the distribution unit 34. The cache 33 caches the streaming data read by the read unit 32. The distribution unit 34 controls the read unit 32 based on the requests sent from the cache servers $10_1$ to $10_n$, and sends the streaming data cached in the cache 33 to a cache server among the cache servers $10_1$ to $10_n$.

With such a structure, the cluster server apparatus 10 according to the present embodiment can distribute streaming data with optimal load-distribution to the cache servers. Further, if a failure occurs in one cache server to disable data distribution to the terminals, the cluster server apparatus 10 can also carry out a fail-safe operation to continue data distribution with another cache server. Still further, the cluster server apparatus 10 can carry out a data recovery operation after recovery of the cache server that has not been able to distribute data to the terminals.

The above-described operation of the cluster server apparatus 10 according to the present embodiment is now described in more detail.

(1) Operation of Distributing Streaming Data

Figure 3:
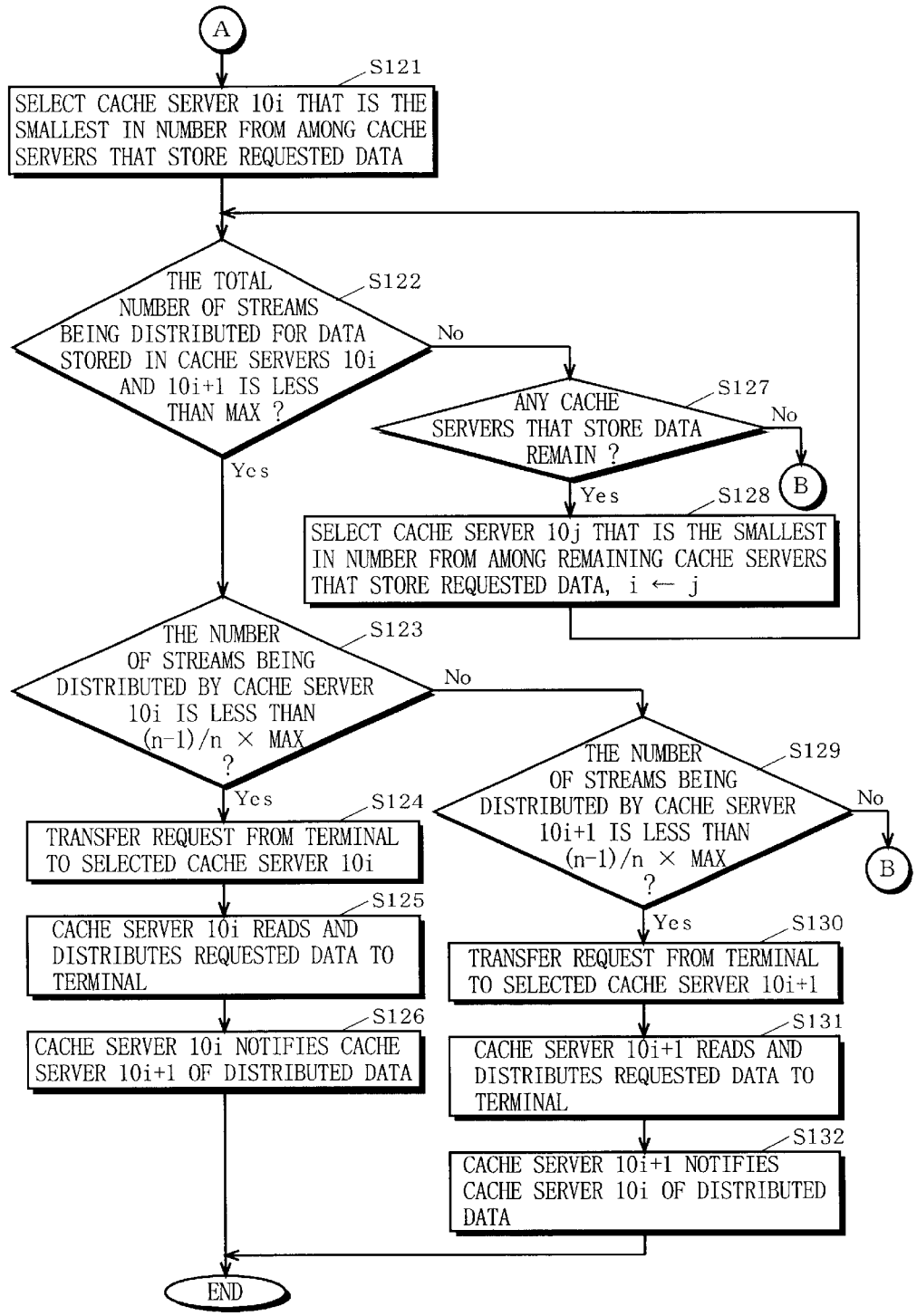

The operation of distributing streaming data with optimal load-distribution to the cache servers is now described further with reference to FIGS. 2 and 3.

FIGS. 2 and 3 are each flowcharts for explaining the operation of distributing streaming data performed by the cluster server apparatus 10 according to the embodiment of the present invention. Note that it is assumed herein that, similar to the system environment shown in FIG. 1, the cluster server apparatus 10 is structured by the n cache servers $10_1$ to $10_n$, and carries out data distribution among the m terminals $4_1$ to $4_m$.

Referring to FIG. 2, a request for streaming data from a terminal $4_y$ (where y is any number from 1 to m) is received by the cluster control unit 21 (step S101). Upon receiving the request for the streaming data, the cluster control unit 21 inquires each of the cache servers $10_1$ to $10_n$ for the number of streams currently being distributed and whether or not the requested streaming data is stored in any of the streaming data storage units $15_1$ to $15_n$ (step S102). In response to this inquiry, each of the cache servers $10_1$ to $10_n$ provides the cluster control unit 21 with the number of streams currently being distributed by each of the cache servers $15_1$ to $15_n$ based on the information in the session management units $11_1$ to $11_n$ respectively, and whether or not the streaming data is stored based on the information in the streaming data management units $14_1$ to $14_n$, respectively.

Each of the streaming data management units $14_1$ to $14_n$ holds information as shown in FIG. 4, for example. In FIG. 4, the streaming data management unit $14_x$ holds a streaming data number or name, a storage location in the streaming data storage unit $15_x$, and a previous access time. With such information, the cache server $10_x$ can recognize which streaming data is stored in which location of the streaming data storage unit $15_x$.

Next, as shown in FIG. 2, the cluster control unit 21 recognizes, based on the responses from all the cache servers $10_1$ to $10_n$, whether or not the requested streaming data is stored in any of the streaming data storage units $15_1$ to $15_n$ of the cache servers $10_1$ to $10_n$ (step S103).

Still referring to FIG. 2, the case in which the cluster control unit 21 recognizes that the requested streaming data is not stored in any of the cache servers $10_1$ to $10_n$ (Step S103, No) is described. The operation in steps S104 to S111 described below basically corresponds to an initialization operation in the cluster server apparatus 10.

If the cluster control unit 21 recognizes that the requested streaming data is not stored in any of the cache servers (No in step S103), the cluster control unit 21 selects a cache server $10_k$ (where k is any number from 1 to n) with the smallest number of streams currently being distributed from among all of the cache servers $10_1$ to $10_n$ (step S104).

The cluster control unit 21 then determines whether the number of streams currently being distributed by the selected cache server $10_k$ is less than or equal to a value $\{((n-1)/n) \times MAX\}$ or not (step S105). Note that MAX represents the maximum number of streams that a single cache server can distribute.

If it is determined in step S105 that the number of streams currently being distributed by the selected cache server $10_k$ is less than or equal to the value $\{((n-1)/n) \times MAX\}$, the cluster control unit 21 transfers the request from the terminal $4_y$ to the selected cache server $10_k$ (step S106). Note that a load state management unit may be provided for holding states of distribution which are obtained through communication between the session management unit $11_k$ and all of the cache servers $10_1$ to $10_n$ at regular intervals. In this case, the load state management unit selects the cache server $10_k$ for transferring the request from the terminal $4_y$ thereto.

On the other hand, if No in step S105, i.e., it is determined in step S105 that the number of streams currently being distributed by the selected cache server $10_k$ exceeds the value $\{((n-1)/n) \times MAX\}$, the cluster control unit 21 issues a notification of rejecting the request, and ends the distribution operation (step S111).

When receiving the request from the cluster control unit 21, the selected cache server $10_k$ sends a request to the content server 30 because the requested streaming data is not stored in the streaming data storage unit $15_k$. Here, the cache control unit $17_k$ sends the request as a request also from the cache control unit $17_{k+1}$ of the cache server $10_{k+1}$ that succeeds the cache server $10_k$ in system management (step S107).

On receiving the request from the cache server $10_k$, the content server 30 reads the streaming data from the streaming data storage unit 31, and sends the streaming data to the cache servers $10_k$ and $10_{k+1}$ (step S108).

When receiving the streaming data, the cache server $10_k$ stores the streaming data in the streaming data storage unit $15_k$, and also updates the information in the streaming data management unit $14_k$. Note that, if the cache control unit $17_k$ sends, in step S107, a request with its sender address changed into a multicast address for one-to-many communications, the cache server $10_k$ controls the streaming data to the multicast address transmitted from the content server 30 to be received by a newly-provided cache data management unit and the streaming data is then stored in the streaming data storage unit $15_k$. Then, the data distribution unit $12_k$ of the cache server $10_k$ distributes the streaming data stored in the streaming data storage unit $15_k$ to the terminal $4_y$ through the cluster control unit 21 (step S109). The cache server $10_k$ also notifies the cache server $10_{k+1}$ of the data contents distributed to the terminal $4_y$ at regular intervals (step S110). The information for notifying the cache server $10_{k+1}$ of the data contents distributed to the terminal $4_y$ indicates, as exemplarily shown in FIG. 5, which part of which streaming data is distributed to which of any of the terminals $4_1$ to $4_m$. Note that the cache server $10_k$ may provide notification of distribution information every time it distributes data to one or more terminals, or at predetermined intervals for all terminals.

Upon receiving from the content server 30 the streaming data which is not directly requested, the cache server $10_{k+1}$ stores the not-directly-requested streaming data in the streaming data storage unit $15_{k+1}$, and also updates the information in the streaming data management unit $14_{k+1}$ (step S109).

As stated above, through the steps S104 to S110, the streaming data distributed upon a request for the streaming data is stored in two successive cache servers that are managed in conjunction with each other in the system.

Referring to FIG. 3, the case in which the cluster control unit 21 recognizes that the requested streaming data is stored in any one of the cache servers (step S103, Yes) is now described.

If Yes in step S103, the cluster control unit 21 selects a cache server $10_i$ (i is a value that x can take on), which is the smallest sequential number provided in the system management from among the cache servers that store the requested streaming data (step S121). Here, as stated above, the streaming data is always stored in at least a pair of successive cache servers $10_x$ and $10_{x+1}$ (step S109). Therefore, the cluster control unit 21 selects the cache server $10_1$, which has the smallest sequential number, from among the pair of the cache servers $10_x$ and $10_{x+1}$.

For example, if a pair of cache servers $10_2$ and $10_3$ and a pair of cache servers $10_7$ and $10_8$ store the streaming data, the cluster control unit 21 selects the cache server $10_2$.

The cluster control unit 21 then determines, as to the streaming data currently being distributed by the selected cache server $10_i$, whether the total number of distribution streams of the streaming data stored in the streaming data storage units $15_i$ and $15_{i+1}$ is less than MAX or not (step S122). If it is determined in step S122 that the number of streams is not less or equal to than MAX, the cluster control unit 21 selects a cache server $10_j$ (j is a value that x can take on), which is the smallest sequential number, from among the remaining cache servers that stores the same streaming data (step S128). Then, the procedure returns to step S122 for a determination as to whether the total number of distribution streams of the streaming data stored in the streaming data storage units $15_j$ and $15_{j+1}$ is less than MAX or not.

For example, in the above example, if the total number of distribution streams in the cache servers $10_2$ and $10_3$ is not less than MAX, the cluster control unit 21 selects the cache server $10_7$. If no other cache servers store the same streaming data, the procedure goes to step S104 in FIG. 2 for further processing (step S127).

On the other hand, if it is determined in step S122 that the number of distribution streams of the streaming data stored in the streaming data storage units $15_i$ and $15_{i+1}$ is less than or equal to MAX, the cluster control unit 21 determines whether the number of streams currently being distributed by the cache server $10_i$ is less than or equal to a value $\{((n-1)/n) \times MAX\}$ or not (step S123).

The determination made in steps S122 and S123 by the cluster control unit 21 is based on the information as shown in FIG. 6, for example. In FIG. 6, "cache server" indicates each sequential number assigned to the respective cache servers $10_1$ to $10_n$; "cache" indicates whether or not the requested streaming data is cached or not; "the number of distribution streams 1" indicates the total number of distribution streams of the streaming data stored in the cache servers $10_i$ and $10_{i+1}$; and "the number of distribution streams 2" indicates the total number of distribution streams of the streaming data stored in the cache servers $10_i$ and $10_{i-1}$.

In FIG. 6, the number of distribution streams currently being distributed by the cache server $10_2$ is 120+1000=1120, and the number of distribution streams of the streaming data stored in both cache servers $10_2$ and $10_3$ is 120 for the cache server $10_2$ and 500 for the cache server $10_3$. Therefore, 620 is compared with MAX for the determination in step S122, while 1120 is compared with $\{((n-1)/n) \times MAX\}$ for the determination in step S123.

Note that, if there is no need to concern the case in which a failure occurs in any one of the cache servers, it is not necessary to determine whether the number of streams currently being distributed by the cache server $10_i$ is less than or equal to the value $\{((n-1)/n) \times MAX\}$ or not. Instead, a determination may be made for the streaming data currently being distributed by the cache server $10_i$ as to whether the total number of distribution streams of the streaming data stored in the streaming data storage units $15_i$ and $15_{i+1}$ is less than MAX or not. In this case, each streaming data storage unit $15_x$ can be efficiently utilized.

Referring back to FIG. 3, if Yes in step S123, i.e., it is determined that the number of streams currently being transmitted by the cache server $10_i$ is less than or equal to the value $\{((n-1)/n) \times MAX\}$, the cluster control unit 21 transfers the request from the terminal $4_y$ to the selected cache server $10_i$ (step S124). When the cache server $10_i$ receives the request from the cluster control unit 21, the data distribution unit $12_i$ reads the streaming data stored in the streaming data storage unit $15_i$, and then distributes the streaming data to the terminal $4_y$ through the cluster control unit 21 (step S125). The cache server $10_i$ also notifies the cache server $10_{i+1}$ of the data contents distributed to the terminal $4_y$ at regular intervals (step S126).

On the other hand, if No in step S123, i.e., it is determined that the number of streams currently being transmitted by the cache server $10_i$ exceeds the value $\{((n-1)/n) \times MAX\}$, the cluster control unit 21 further determines whether the number of streams currently being distributed by the cache server $10_{i+1}$ is less than or equal to the value $\{((n-1)/n) \times MAX\}$ or not (step S129).

If Yes in step S129, the cluster control unit 21 transfers the request received from the terminal $4_y$ to the cache server $10_{i+1}$ (step S130). When the cache server $10_{i+1}$ receives the request from the cluster control unit 21, the data distribution unit $12_{i+1}$ reads the streaming data stored in the streaming data storage unit $15_{i+1}$, and then distributes the streaming data to the terminal $4_y$ through the cluster control unit 21 (step S131). The cache server $10_{i+1}$ also notifies the cache server $10_i$ of the data contents distributed to the terminal $4_y$ at regular intervals (step S132).

If No in step S129, the procedure goes to step S104 in FIG. 2 for further processing.

(2) Fail-safe Operation

Next, a fail-safe operation is now described. In the fail-safe operation, even when any one of the cache servers in the cluster server apparatus becomes unable to carry out data distribution to the terminals due to a failure that occurred in the any one of the cache servers, another cache server takes over for the failed cache server so as to continue data distribution.

As stated above, the cache server $10_x$ distributes the streaming data to the terminal $4_y$, while notifying the cache server $10_{x+1}$ or $10_{x-1}$ of the information corresponding to the distributed streaming data at regular intervals (step S110, S126, S132). On the other hand, the distribution-disabled detection units $13_{x+1}$ and $13_{x-1}$ of the cache servers $10_{x+1}$ and $10_{x-1}$, respectively, monitor the information received at regular intervals from the cache server $10_x$.

Now consider the case in which the cache server $10_x$ has a failure and becomes unable to carry out data distribution to the terminal $4_y$. It is assumed herein that the cache servers $10_x$ and $10_{x+1}$ manage certain streaming data in common.

In the above case, when the distribution information, which is supposed to arrive at regular intervals from the cache server $10_x$, does not arrive, the distribution-disabled detection unit $13_{x+1}$ of the cache server $10_{x+1}$ detects a distribution-disabled (occurrence of failure) state of the cache server $10_x$. When the distribution-disabled detection unit $13_{x+1}$ detects the distribution-disabled state, the data distribution unit $12_{x+1}$ reads streaming data that succeeds the streaming data most recently distributed by the cache server $10_x$ from the streaming data storage unit $15_{x+1}$ based on the distribution information previously received from the cache server $10_x$ (before the failure occurs), and then distributes the read streaming data that succeeds the streaming data most recently distributed before the failure of the cache server $10_x$ to the terminal $4_y$. This distribution and reading operation is carried out within a predetermined time period so as not to interrupt the streaming data. The predetermined time period means a time period during which the streaming data most recently distributed is completely played back in the terminal $4_y$.

If the cache servers $10_{x-1}$ and $10_x$ manage certain streaming data in common, and the cache server $10_x$, which is supposed to carry out data distribution, fails, the above-described fail-safe operation is carried out by the cache sever $10_{x-1}$.

As such, if the cache server $10_{x+1}$ or $10_{x+1}$ takes over distribution of the streaming data, the cache control unit $17_{x+1}$ or $17_{x-1}$ notifies the cluster control unit 21 of the fail-safe state so that new streaming data is not to be stored in the streaming data storage units $15_{x+1}$ or $15_{x-1}$ until the recovery of the cache server $10_x$ is detected. Once notified of the fail-safe state, the cluster control unit 21 restrains itself from selecting the cache server $10_{x+1}$ or $10_{x-1}$ when selecting one of the cache servers $10_1$ to $10_n$ for storing new streaming data (steps S104, S121).

(3) Recovery Operation

Next, a recovery operation is now described by assuming that the cache server $10_x$ which has not been able to carry out data distribution to the terminals due to a failure thereof is recovered.

The data distribution unit $12_x$ of the recovered cache server $10_x$ provides a recovery notification to the data distribution units $12_{x+1}$ and $12_{x-1}$ of the cache servers $10_{x+1}$ and $10_{x-1}$, respectively.

Upon receiving the recovery notification, the data distribution unit $12_{x+1}$ of the cache server $10_{x+1}$ selects the streaming data stored in both the cache servers $10_x$ and $10_{x+1}$ from among the streaming data stored in the streaming data storage unit $15_{x+1}$, and then copies the selected streaming data to the streaming data storage unit $15_x$ of the cache server $10_x$. Moreover, upon receiving the recovery notification, the data distribution unit $12_{x-1}$ of the cache server $10_{x+1}$ selects the streaming data stored in both the cache servers $10_x$ and $10_{x-1}$ from among the streaming data stored in the streaming data storage unit $15_{x-1}$, and then copies the selected streaming data to the streaming data storage unit $15_x$ of the cache server $10_x$.

Then, after the copying of the streaming data to the cache server $10_x$ is completed, the cache control units $17_{x+1}$ and $17_{x-1}$ of the cache servers $10_{x+1}$ and $10_{x-1}$ each send a notification of clearing the fail-safe state to the cluster control unit 21.

Specific Example of Operation

Next, the fail-safe and recovery operations are exemplarily described in further detail using a specific example.

Here, the case in which the cluster server apparatus 10 includes four cache servers $10_1$ to $10_4$ is described as the example.

Figure 7:
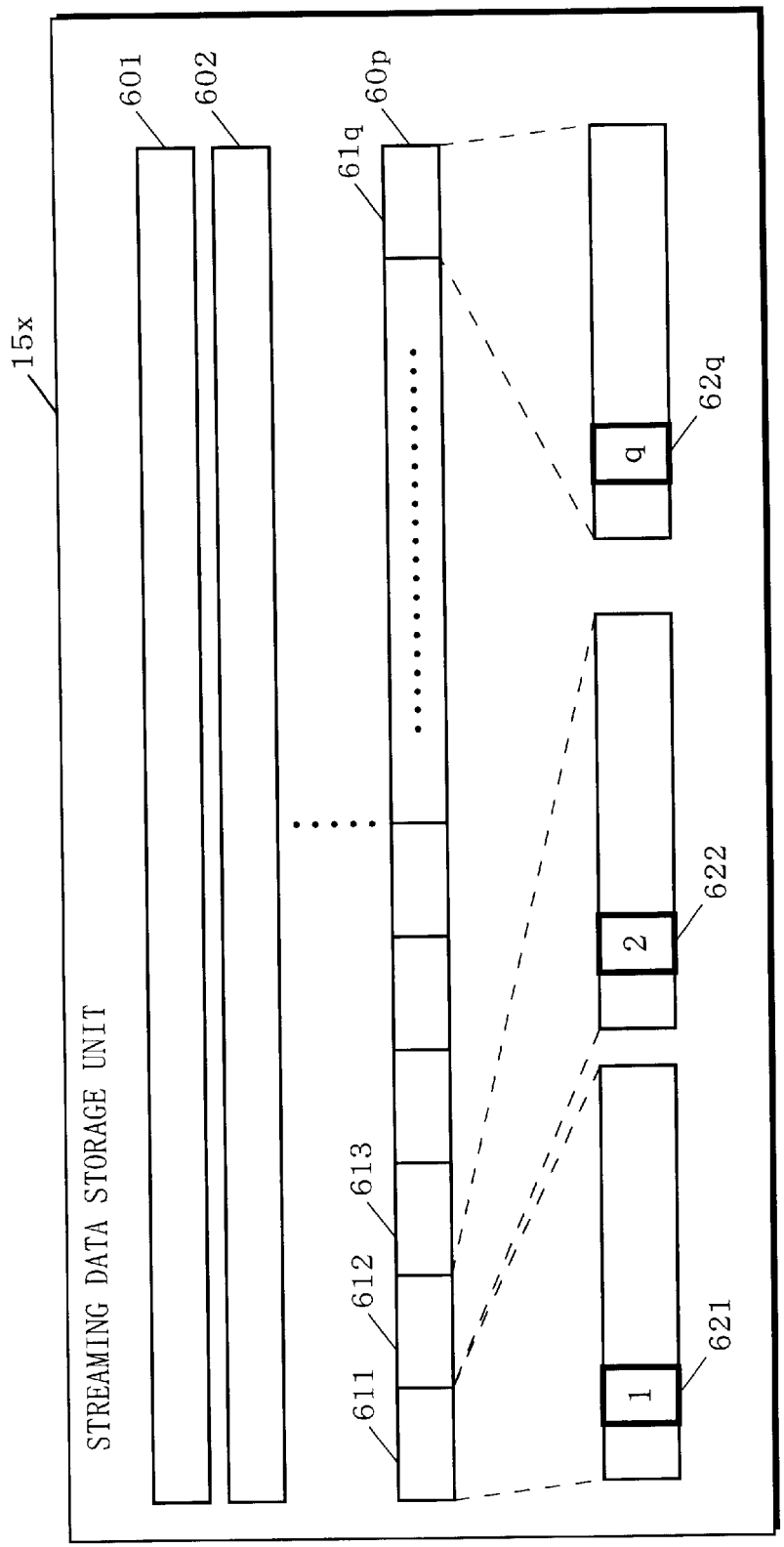
FIG. 7 is a diagram showing an example of the structure of streaming data held in a streaming data storage unit $15_x$.

FIG. 7 is a diagram exemplarily showing streaming data 601 to 60p (where p is a positive integer greater than 1) stored in the streaming data storage unit $15_x$ of the cache server $10_x$. Each of the streaming data 601 to 60p is successive in time such as video and music data. Each of the streaming data 601 to 60p is structured by a plurality of packets 611 to 61q (where q is a positive integer greater than 1), each of which is a unit of transmission. The packets 611 to 61q have packet identifiers 621 to 62q, respectively, for identifying the order of the packets in the streaming data.

Precondition 1: State of the Streaming Data Stored in Cache Server

Figure 8:
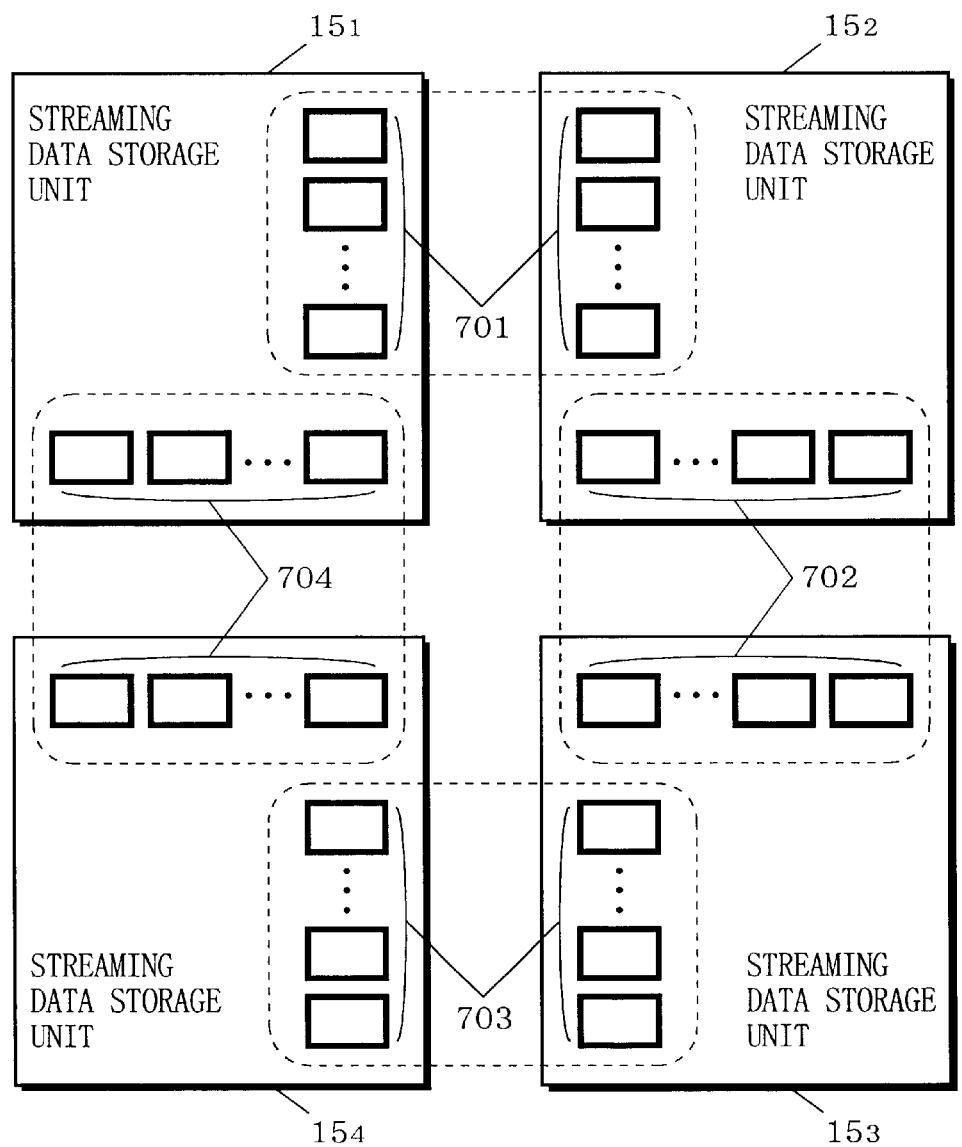
FIG. 8 is a diagram showing an example of a state of streaming data stored in streaming data storage units $15_1$ to $15_4$ in cache servers $10_1$ to $10_4$.

As stated above, in the cluster server apparatus 10, the streaming data distributed based on the request is stored in two successive cache servers which are managed in common in the system. Therefore, in the present example, as shown in FIG. 8, streaming data 701 is stored in the streaming data storage units $15_1$ and $15_2$ of the cache servers $10_1$ and $10_2$. Similarly, streaming data 702 is stored in the streaming data storage units $15_2$ and $15_3$ of the cache servers $10_2$ and $10_3$; streaming data 703 is stored in the streaming data storage units $15_3$ and $14_4$ of the cache servers $10_3$ and $10_4$; and streaming data 704 is stored in the streaming data storage units $15_4$ and $15_1$ of the cache servers $10_4$ and $10_1$.

Precondition 2: The Number of Distribution Streams

As stated above, the cluster control unit 21 transfers a request to any one of the cache servers $10_1$ to $10_4$ so as to satisfy the following conditions, where the maximum number MAX of distribution streams that a single cache server can distribute is assumed to be 8.

(Condition 1) The number of streams that can be distributed at one time by each of the cache servers $10_1$ to $10_4$ is equal to or less than 6 $(=((n-1)/n) \times MAX = ¾ \times 8)$.

(Condition 2) The number of distribution streams stored in each of the two successive cache servers managed in common in the system is equal to or less than 8 (=MAX).

Precondition 3: Session Management

A session management method carried out by the session management units $11_1$ to $11_4$ of the cache servers $10_1$ to $10_4$ is now described with reference to FIGS. 9 and 10.

The session management units $11_1$ to $11_4$ hold the number of distribution streams of the cache servers $10_1$ to $10_4$ using session management tables $53_1$ to $53_8$. Here, each of the cache servers $10_1$ to $10_4$ holds two session management tables. That is, as shown in FIG. 9, the cache server $10_1$ uses the session management table $53_2$ for managing sessions related to the streaming data 701 stored in the cache servers $10_1$ and $10_2$, thereby holding the state of distribution of the cache server $10_2$, while also using the session management table $53_1$ for managing sessions related to the streaming data 704 stored in the cache servers $10_1$ and $10_4$, thereby holding the state of distribution of the cache server $10_4$. The cache server $10_2$ uses the session management table $53_4$ for managing sessions related to the streaming data 702 stored in the cache servers $10_2$ and $10_3$, thereby holding the state of distribution of the cache server $10_3$, while also using the session management table $53_3$ for managing sessions related to the streaming data 701 stored in the cache servers $10_2$ and $10_1$, thereby holding the state of distribution of the cache server $10_1$. The cache server $10_3$ uses the session management table $53_6$ for managing sessions related to the streaming data 703 stored in the cache servers $10_3$ and $10_4$, thereby holding the state of distribution of the cache server $10_4$, while also using the session management table $53_5$ for managing sessions related to the streaming data 702 stored in the cache servers $10_3$ and $10_2$, thereby holding the state of distribution of the cache server $10_2$. The cache server $10_4$ uses the session management table $53_8$ for managing sessions related to the streaming data 704 stored in the cache servers $10_4$ and $10_1$, thereby holding the state of distribution of the cache server $10_1$, while also using the session management table $53_7$ for managing sessions related to the streaming data 703 stored in the cache servers $10_4$ and $10_3$, thereby holding the state of distribution of the cache server $10_3$.

Figure 9:
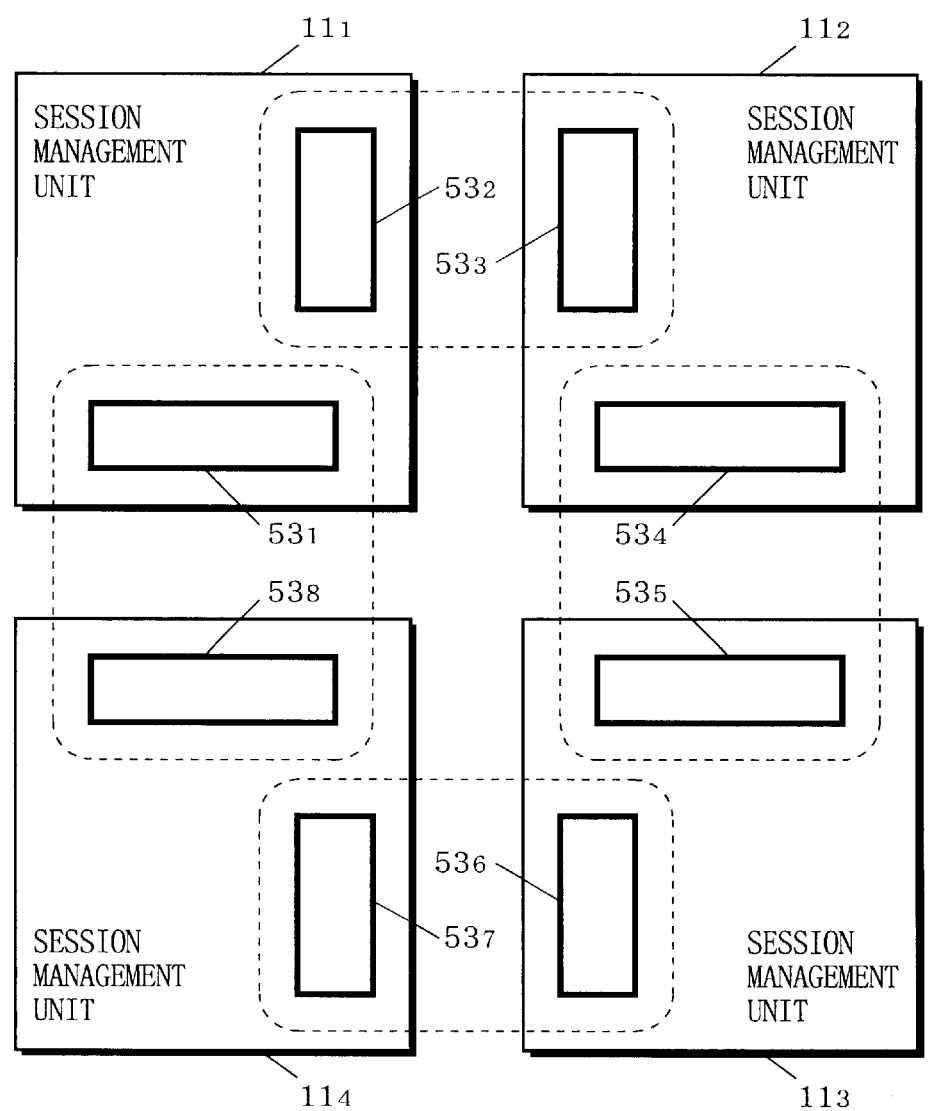
FIG. 9 is a diagram showing an example of a state of streaming data stored in session management units $11_1$ to $11_4$ in the cache servers $10_1$ to $10_4$.

For example, if a stream request arrives at the cache server $10_1$ or $10_2$ for the streaming data 701 stored in the cache servers $10_1$ and $10_2$ in common, the session management tables $53_2$ and $53_3$ in FIG. 9 each register information about that request. The information registered in the session management tables $53_2$ and $53_3$ is updated as the streaming data is distributed.

Description of the session management method is now further made below with reference to FIG. 10.

To distribute a stream to the terminals $4_1$ to $4_m$, the cache servers $10_1$ to $10_4$ are connected through the networks 51 and 52 to the terminals $4_1$ and $4_m$ and the cluster control unit 21. Now, an execution of distributing a stream among the terminals through network connection is herein called a session.

Figure 10:
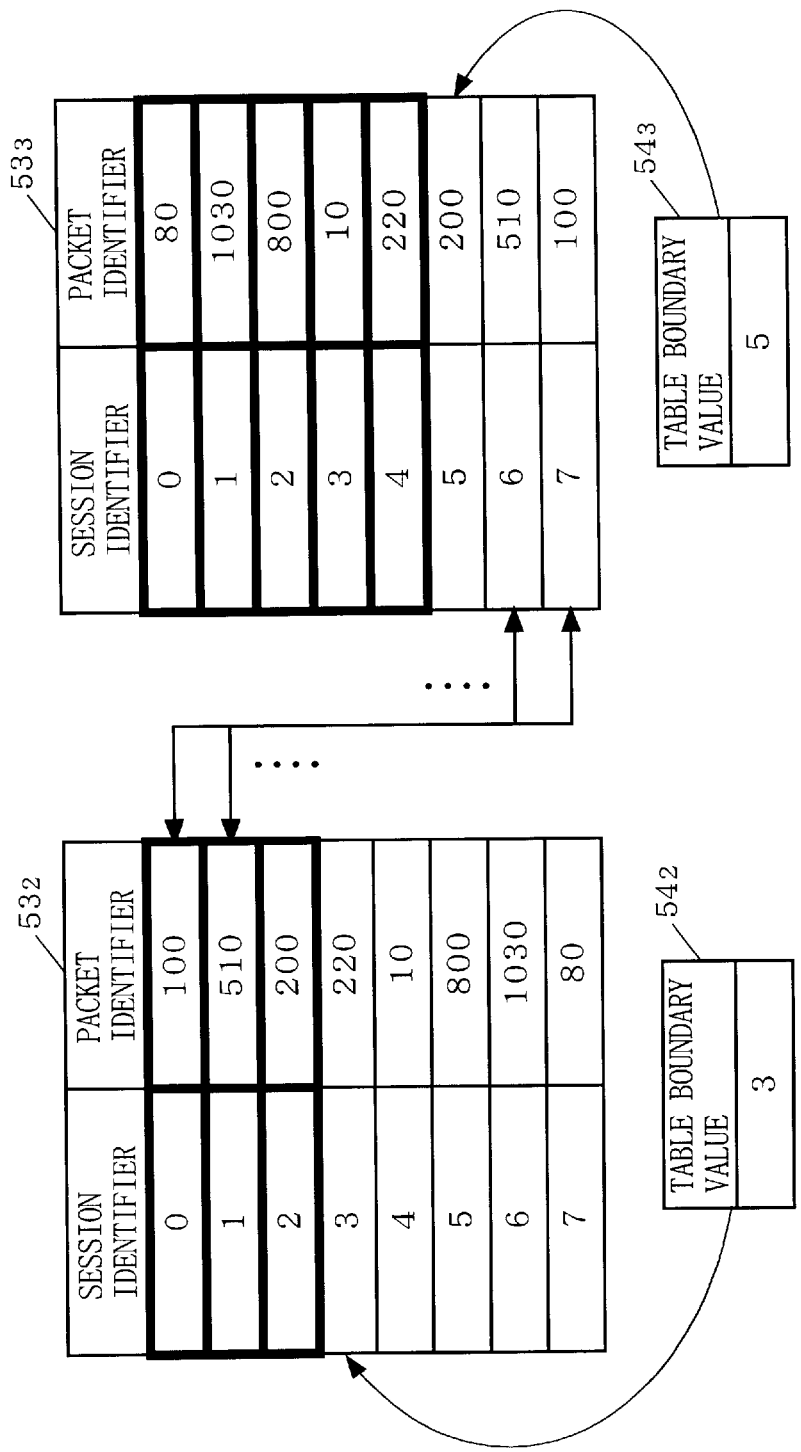
FIG. 10 is a diagram showing session management tables $53_2$ and $53_3$ shown in FIG. 9 in detail.

FIG. 10 is a diagram showing the session management tables $53_2$ and $53_3$ shown in FIG. 9. In each of the session management tables $53_2$ and $53_3$, a session identifier for identifying the session and a packet identifier indicating a packet most recently sent out are registered. Assume herein that the maximum number MAX of registrable sessions in each of the session management tables $53_1$ to $53_8$ is 8.

In the session management tables $53_2$ and $53_3$, sessions are identified in a reverse order (symmetrically in a table field). That is, the session identified by a session identifier I ($0 \leq$ □ I<MAX) in the session management table $53_2$ is identified by a session identifier (MAX−I−1) in the session management table $53_3$. For example, packet identifiers "100" and "510" of the sessions identified by session identifiers "0" and "1" in the session management table $53_2$ are registered in the session management table $53_3$ as identified by session identifiers "7" and "6", respectively.

Table boundary values $54_2$ of the session management table $53_2$ and $54_3$ session management table $53_3$ indicate numbers of the session identifiers at which the information registered in the session management tables $53_2$ and $53_3$ is divided into two. As described above, in the session management tables $53_2$ and $53_3$, sessions are registered in the reverse order. Therefore, if the table boundary value of one session management table is set to F ($0 \leq$ □ F<MAX), the table boundary value of the other session management table is set to (MAX−F). In FIG. 10, the table boundary value 543 of the session management table $53_3$ is set to "3", while the table boundary value $54_3$ of the session management table $53_3$ is set to "5".

The data distribution units $12_1$ to $12_4$ of the cache servers $10_1$ to $10_4$ transmit to the terminal only streaming data with respect to a session with the session identifier I equal to or smaller than the table boundary value F. More specifically, the cache servers $10_1$ to $10_4$ repeat the following first and second steps.

First step: Compare the session identifier I with the table boundary value F. If I<F, extract, from the streaming data storage unit, a packet that immediately comes after the packet corresponding to the session identifier I in the session management table, and send the extracted packet to the terminal.

Second step: Update the value of the packet identifier corresponding to the session identifier I in the session management table to the value of the packet identifier of the packet sent out in the above first step.

For example, in FIG. 10, for the sessions identified by the session identifiers "0" to "2" in the session management table $53_2$ of the cache server $10_1$ (surrounded by a thick line in FIG. 10 on the left), the data distribution unit 121 of the cache server $10_1$ transmits the relevant streaming data and updates the values of the packet identifiers. Similarly, for the sessions identified by the session identifiers "0" to "4" in the session management table $53_3$ of the cache server $10_2$ (surrounded by a thick line in FIG. 10 on the right), the data distribution unit $12_2$ of the cache server $10_2$ transmits the relevant streaming data and updates the values of the packet identifiers.

Precondition 4: Operation of the Distribution-disabled Detection Unit

Figure 11:
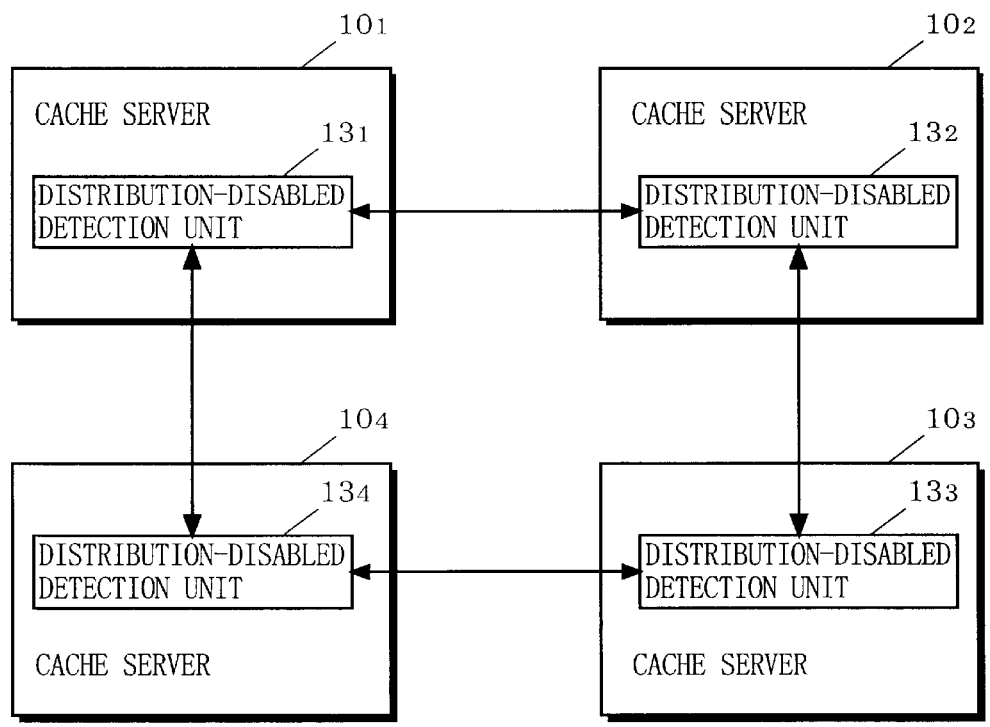
FIG. 11 is a diagram showing a communication relation among distribution-disabled detection units $13_1$ to $13_4$ in the cache servers $10_1$ to $10_4$.

Each session management table includes a session with a session identifier I larger than the table boundary value F. Stream data corresponding to such session is currently distributed by the other cache server of one pair. Further, as mentioned above, the distribution-disabled detection units $13_x$ and $13_{x+1}$ of the cache servers $10_x$ and $10_{x+1}$ communicate with each other. The operation of these distribution-disabled detection units are now described with reference to FIGS. 11 and 12. FIG. 11 is a diagram showing an exemplary operation of the distribution-disabled detection units $13_1$ to $13_n$ of the cache servers $10_1$ to $10_n$, respectively, where n=4.

Each of the distribution-disabled detection units $13_1$ to $13_4$ regularly communicates with its adjacent cache servers. For example, the distribution-disabled detection unit $13_1$ regularly communicates with the distribution-disabled detection units $13_2$ and $13_4$. If the cache server $10_2$ or $10_4$ becomes unable to distribute data, the distribution-disabled detection unit $13_1$ instructs the data distribution unit $12_1$ of the cache server $10_1$, instead of the cache server $10_2$ or $10_4$, to start distribution of streaming data without interruption.

Figure 12:
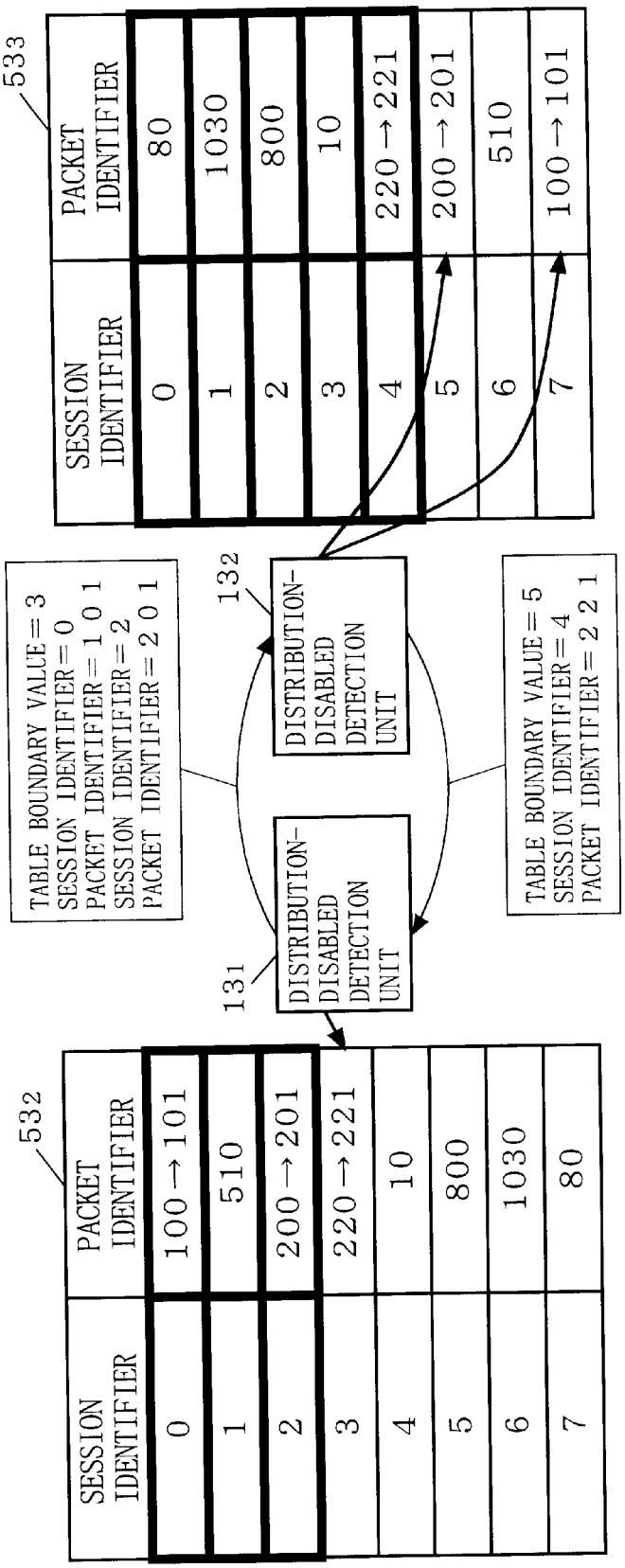
FIG. 12 is a diagram showing the contents to be communicated between the distribution-disabled detection units $13_1$ and $13_2$ shown in FIG. 11.

FIG. 12 is a diagram schematically showing the operation of sending and receiving a notification between the distribution-disabled detection units $13_1$ and $13_2$. The session management tables $53_2$ and $53_3$ are held by the cache servers $10_1$ and $10_2$, respectively.

The distribution-disabled detection units $13_1$ and $13_2$ regularly notify each other of the table boundary value and the values of the session identifier and packet identifier of the session that has been updated since the previous notification.

For example, consider the case in which, since the previous notification until the present notification the values of the packet identifiers of the sessions identified by the session identifiers "0" and "2" in the cache server $10_1$ have been updated from "100" and "200" to "101" and "201", respectively. In this case, the distribution-disabled detection unit $13_1$ notifies the distribution-disabled detection unit $13_2$ of its own table boundary value and the updated packet identifier values. Moreover, in the cache server $10_2$, if the packet identifier of the session identified by the session identifier "4" has been updated from "220" to "221" since the previous notification until the present notification, the distribution-disabled detection unit $13_2$ notifies the distribution-disabled detection unit $13_1$ of its own table boundary value and the updated packet identifier value. Note that the table boundary value is always notified of every time updating occurs, but is changed only when the value F or (MAX−F) for notification differs from the current value (MAX−F) or F. In the example shown in FIG. 12, the table boundary value is not changed.

With the present notification, the distribution-disabled detection unit $13_1$ detects that the packet identifier of the session identifier "4" has been updated to "221". The packet identifier corresponding to the session identifier I in the session management table $53_3$ is stored with a session identifier "3" (=MAX−I−1) in the session management table $53_2$. Therefore, the distribution-disabled detection unit $13_1$ updates the packet identifier value of the session identifier "3" to "221". Similarly, with the present notification, the distribution-disabled detection $13_2$ detects that the packet identifiers of the session identifiers "0" and "2" have been updated to "101" and "201", respectively. Then, the distribution-disabled detection unit $13_2$ updates the packet identifier values of the session identifier "7" and "5" to "$10_1$" and "201", respectively.

Basic Operation 1: When the Adjacent Cache Server has a Failure

Figure 13:
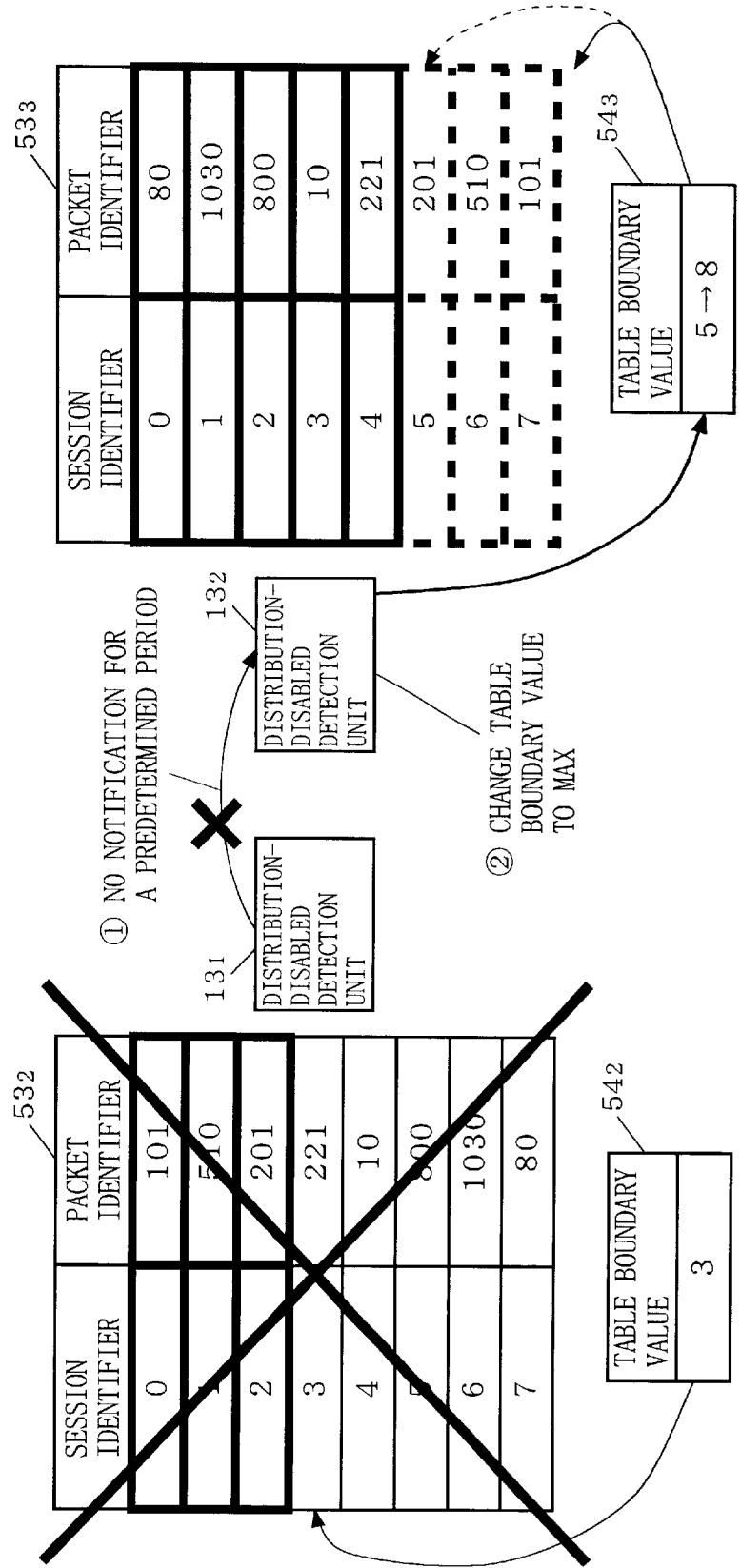
FIG. 13 is a diagram showing the operation of the distribution-disabled detection unit $13_2$ of the cache server $10_2$ if the cache server $10_1$ becomes unable to carry out distribution.

FIG. 13 shows the operation when the cache server $10_1$ becomes unable to carry out distribution due to a failure that occurred therein.

When the cache server $10_1$ becomes unable to carry out data distribution due to a failure thereof, a notification from the distribution-disabled detection unit $13_1$ does not come to the distribution-disabled detection unit $13_2$. If the distribution-disabled detection unit $13_2$ does not receive notification for a predetermined time period, the distribution-disabled detection unit $13_2$ changes the table boundary value $54_3$ to MAX. In FIG. 13, MAX=8, and the table boundary value $54_3$ is therefore changed from "5" to "8".

As a result, the data distribution unit $12_2$ of the cache server $10_2$ determines that the session identifiers "5" to "7" are smaller than the table boundary value F=8 in the session management table $53_3$. Then, the data distribution unit $12_2$ starts streaming data distribution from the packet that immediately comes after the packet corresponding to the session identifier for each session.

Basic Operation 2: Session Overflow (Table Boundary Value Shift)

Figure 14:
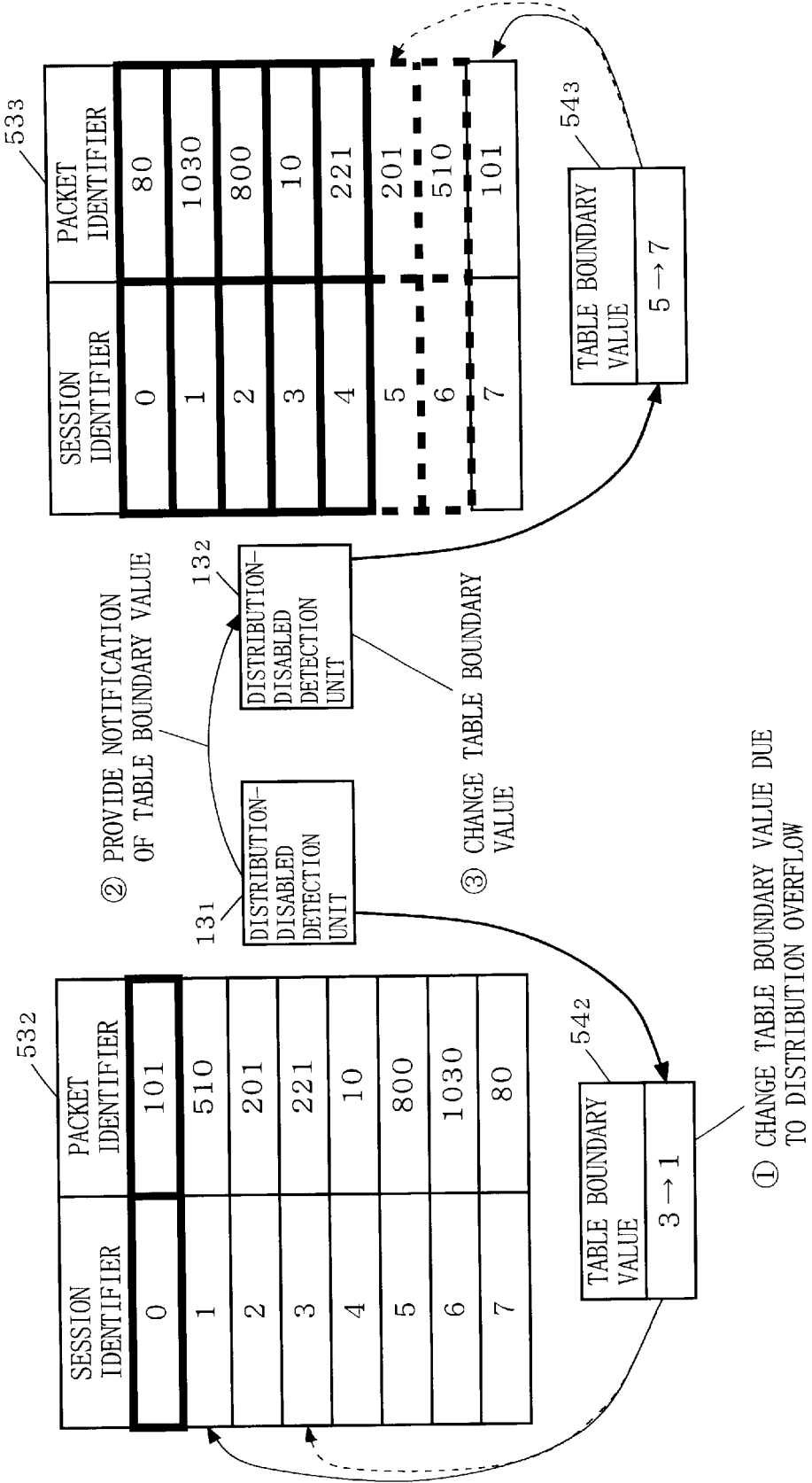
FIG. 14 is a diagram showing the operation of the distribution-disabled detection unit $13_2$ of the cache server $10_2$ if part of a stream distribution from the cache server $10_1$ overflows.

FIG. 14 shows the operation for changing the table boundary value (shifting the table boundary) when the number of streams that the cache server $10_1$ can distribute exceeds the maximum.

The cache server $10_1$ changes its table boundary value if any of the following conditions is satisfied:

(1) Upon detecting a failure in the cache server $10_4$, the cache server $10_1$ starts to distribute streaming data instead of the cache server $10_4$, and consequently, the number of streams that the cache server $10_1$ can distribute exceeds the maximum; and (2) Upon detecting that the table boundary value of the cache server $10_4$ has been changed, the cache server $10_1$ starts streaming data distribution instead of the cache server $10_4$, and consequently, the number of streams that the cache server $10_1$ can distribute exceeds the maximum.

In FIG. 14, the table boundary value $54_2$ is changed from "3" to "1". As a result, the data distribution unit $12_1$ of the cache server $10_1$ determines that the session identifiers "1" and "2" are equal to or larger than the table boundary value F=1 in the session management table $53_2$, and then the data distribution unit $12_1$ stops streaming data distribution. Then, the distribution-disabled detection unit $13_2$ is notified of the table boundary value F=1 by the distribution-disabled detection unit $13_1$. The distribution-disabled detection unit $13_2$ detects through the notification that the table boundary value $54_2$ has been changed, and the distribution-disabled detection unit $13_2$ changes the table boundary value $54_3$ to (MAX−(received table boundary value $54_2$)). In FIG. $14_1$ MAX=8, and the table boundary value $54_3$ is therefore changed from "5" to "7" (=8−1).

Consequently, the data distribution unit $12_2$ of the cache server $10_2$ determines that the session identifiers "5" and "6" are smaller than the table boundary value F=7 in the table management table $53_3$. The data distribution unit $12_2$ then starts streaming data distribution from the packet that immediately comes after the packet corresponding to the session identifier for each session.

Basic Operation 3: When the Adjacent Cache Server is Recovered

As stated above, the cache control unit $17_x$ of the recovered cache server $10_x$ outputs a recovery notification to the data distribution units $12_{x+1}$ and $12_{x-1}$ of the adjacent cache servers $10_{x+1}$ and $10_{x-1}$. The recovered cache server $10_x$ recovers the streaming data by storing the distributed streaming data in the streaming data storage unit $15_x$.

Figure 15:
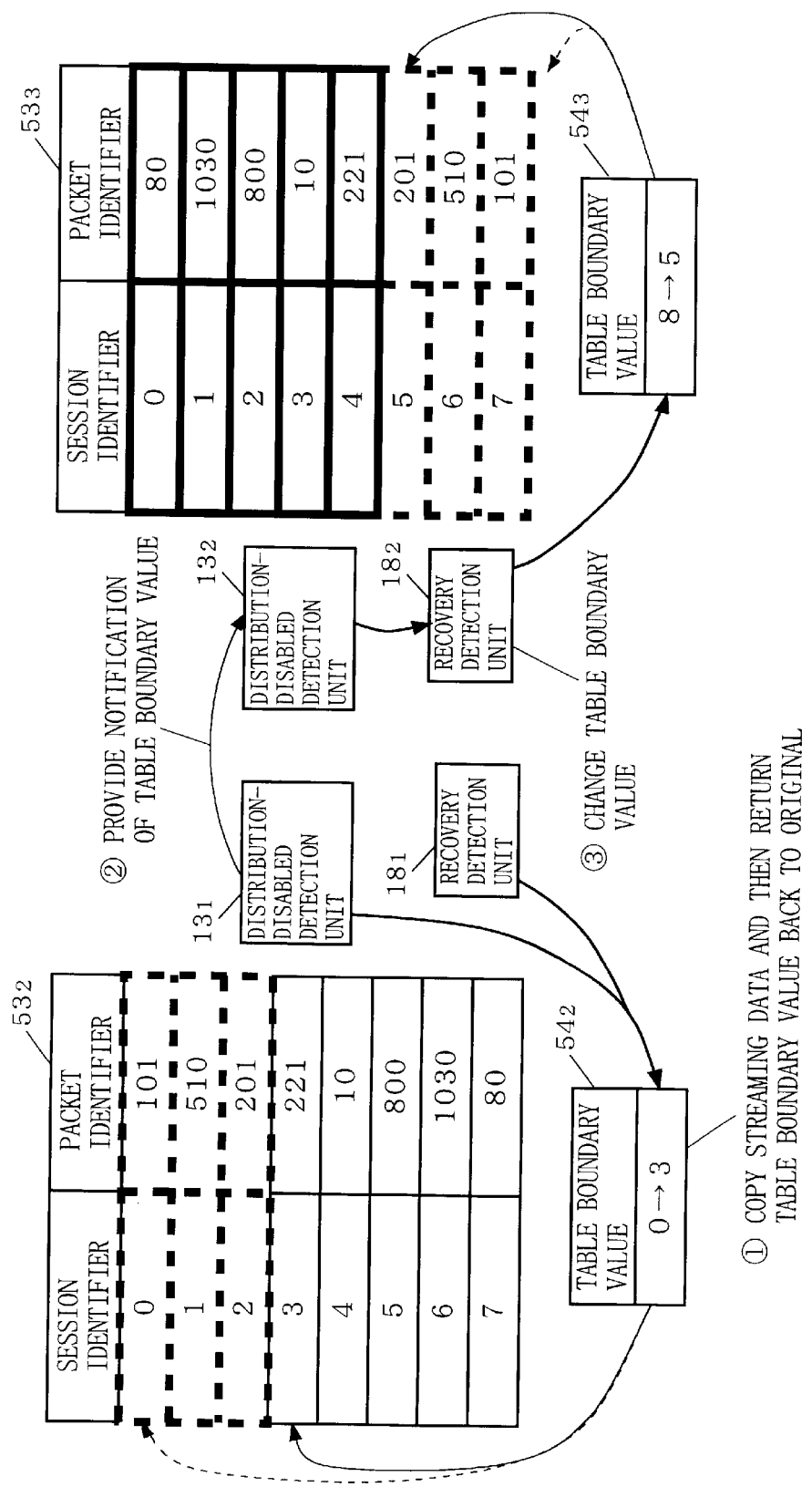
FIG. 15 is a diagram showing the operation of a recovery detection unit $18_1$ and the distribution-disabled detection unit $13_1$ when the cache server $10_1$ which has not been able to carry out distribution is recovered.

FIG. 15 shows the operation when the cache server $10_1$ that has not been able to carry out distribution due to a failure is now recovered for streaming data distribution.

Before the streaming data of the cache server $10_1$ is recovered, the table boundary value $54_2$ is "0" (F=0), and the cache server $10_1$ therefore does not carry out streaming data distribution. When the recovery is completed, the recovery detection unit $18_1$ changes (updates) the table boundary value $54_2$ back to "3", which is the value before the failure occurred.

Consequently, the data distribution unit $12_1$ of the cache server $10_1$ determines that that the session identifiers "0" to "2" are smaller than the table boundary value F=3 in the session management table $53_2$. The data distribution unit $12_1$ then starts streaming data distribution from the packet that immediately comes after the packet corresponding to the session identifier for each session.

Next, the distribution-disabled detection unit $13_1$ notifies the distribution-disabled detection unit $13_2$ of the updated table boundary value $54_2$. The distribution-disabled detection unit $13_2$ detects through the notification that the table boundary value $54_2$ is returned to "3", which is the value before the cache server $10_1$ failed, and then the distribution-disabled unit $13_2$ changes the table boundary value $54_3$ to (MAX—(received table boundary value $54_2$)). In FIG. $15_1$ MAX=8, and therefore, the table boundary value $54_3$ is returned from "8" to "5".

Consequently, the data distribution unit $12_2$ of the cache server $10_2$ determines that the session identifiers "5" to "7" are equal to or larger than the table boundary value "5" in the session management table $53_3$, and then the data distribution unit $12_2$ stops streaming data distribution.

Basic Operation 4: Returning Session (Table Boundary Value Shift)

Basic operation 4 is similar to Basic operation 2 as described above. The recovery detection unit $18_2$ sets the table boundary value $54_3$ back to the value of before the cache server $10_1$ failed, and also sets the other table boundary value held in the cache server $10_2$ (the table boundary value at which the session management table for managing the sessions of the streaming data stored in the cache servers $10_2$ and $10_3$ is divided into two) back to the original value.

Example of the Fail-safe Operation

Figure 16:
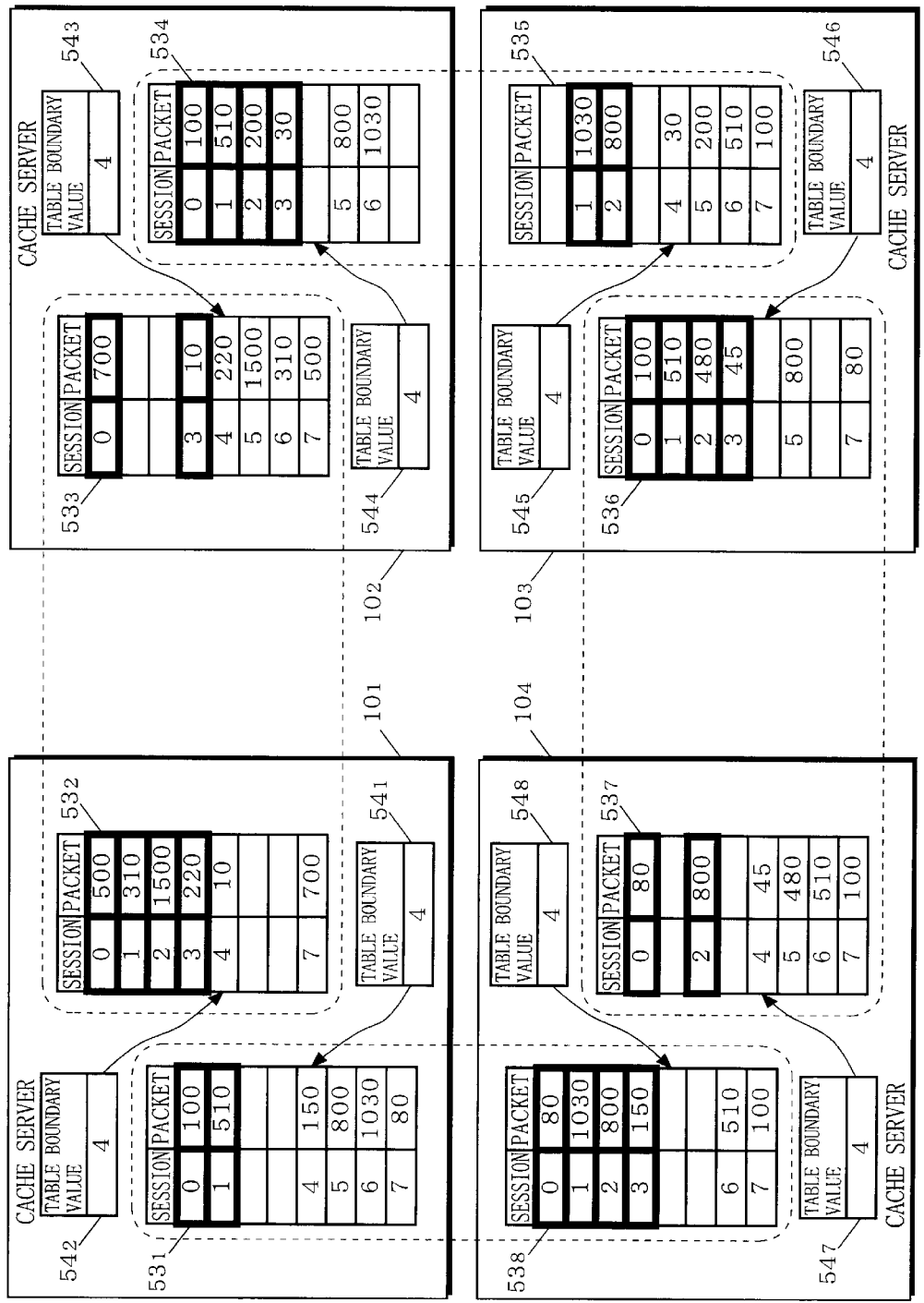
FIG. 16 is a diagram showing a state of session management tables $53_1$ to $53_8$ and table boundary values $54_1$ to $54_8$ when four cache servers $10_1$ to $10_4$ carry out distribution.
Figure 17:
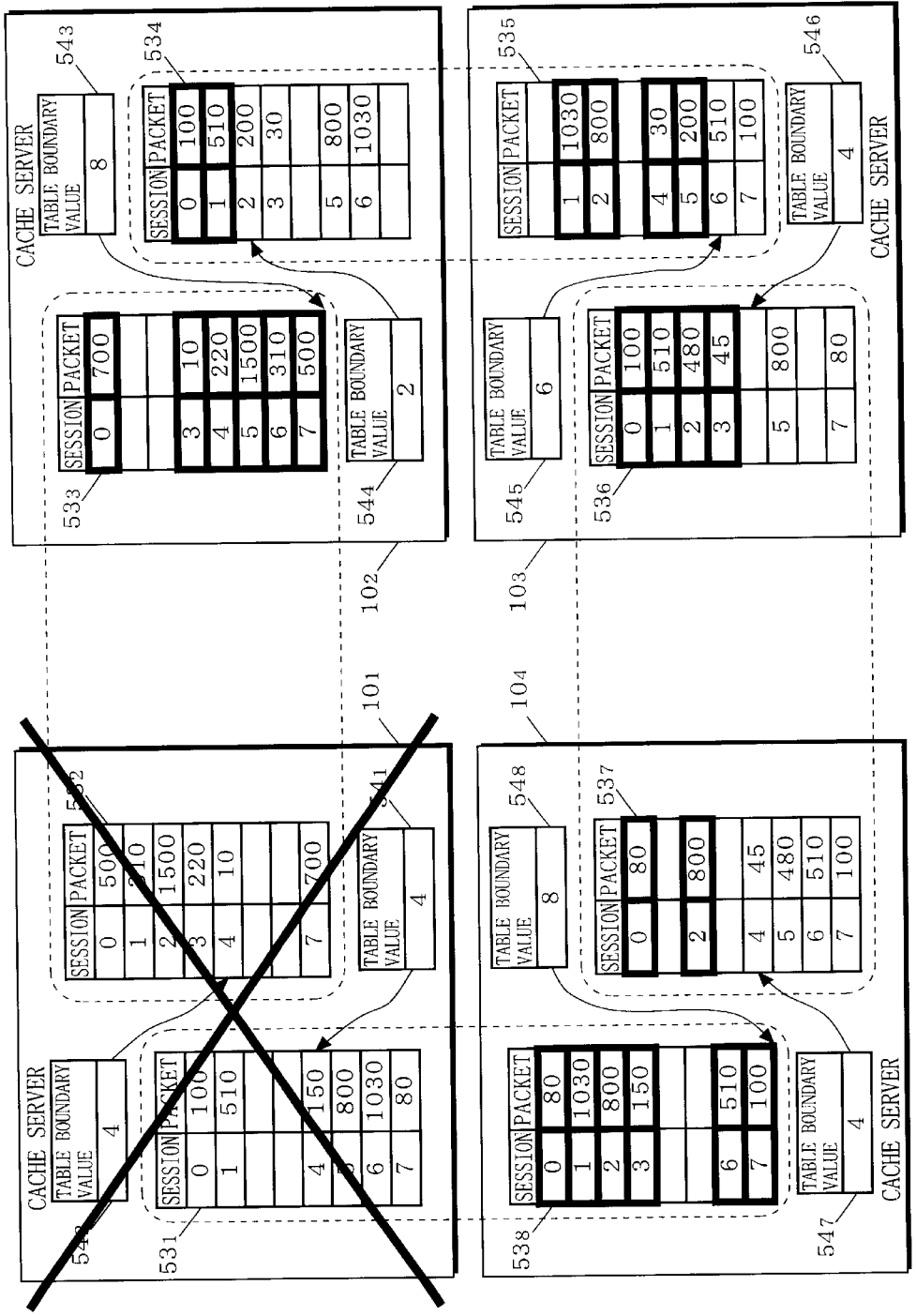
FIG. 17 is a diagram showing a state of the session management tables $53_1$ to $53_8$ and the table boundary values $54_1$ to $54_8$ when the cache server $10_1$ becomes unable to carry out distribution.
Figure 18:
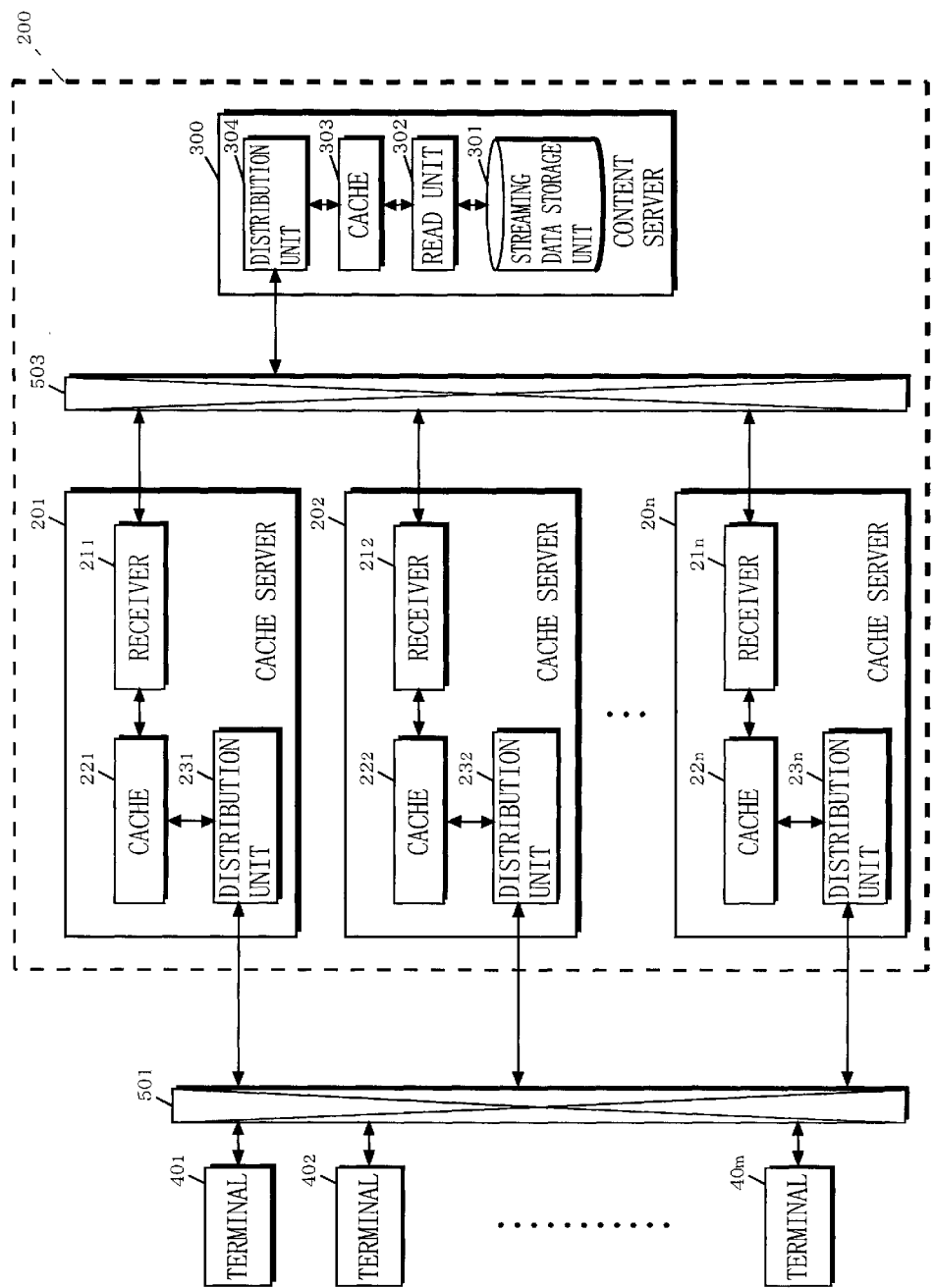
FIG. 18 is a block diagram showing an example of the structure of a distribution system using a conventional cluster server apparatus.

Based on the above-described Preconditions 1 to 4 and Basic operations 1 to 4, a specific example of the fail-safe operation performed by the cluster server apparatus according to the embodiment of the present invention is shown in FIGS. 16 and 17.

FIG. 16 is a diagram showing an example of states of the session management tables $53_1$ to $53_8$ and the table boundary values $54_1$ to $54_8$ managed by the four cache servers $10_1$ to $10_4$ each having the maximum number of distribution streams "8" in normal stream distribution. Note that, in FIG. $16_1$ each of the table boundary values $54_1$ to $54_8$ is "4", and the number of distribution streams (total number of sessions surrounded by a thick line in FIG. 16) that can be distributed at one time by each of the cache servers $10_1$ to $10_4$ is "6".

FIG. 17 is a diagram showing an example of states of the session management tables $53_1$ to $53_8$ and the table boundary values $54_1$ to $54_8$ managed by the cache servers $10_1$ to $10_4$ when the cache server $10_1$ has failed in the states shown in FIG. 16.

In the states shown in FIG. 16, when the cache server $10_1$ becomes unable to carry out data distribution due to a failure, the following process is performed. First, the distribution-disabled detection units $13_2$ and $13_4$ of the cache servers $10_2$ and $10_4$ detect that the cache server $10_1$ becomes unable to carry out distribution, and then the distribution-disabled detection units $13_2$ and $13_4$ set the table boundary values $54_3$ and $54_8$ to "8", respectively. Accordingly, the number of distribution streams in the cache server $10_2$ becomes "10". Therefore, in order to have the cache server $10_3$ distribute the two sessions that exceed the maximum number of distribution streams "8", the distribution-disabled detection unit $13_2$ sets the table boundary value $54_4$ to "2". Similarly, the table boundary value $54_5$ of the cache server $10_3$ is set to "6", but that does not cause the number of distribution streams of the cache server $10_3$ to exceed the maximum number of distribution streams "8", thereby posing no problem. Furthermore, the table boundary value $54_8$ of the cache server $10_4$ is set to "8", but that does not cause the number of distribution streams of the cache server $10_3$ to exceed the maximum number of distribution streams "8", thereby also posing no problem.

With this operation, the cache server $10_2$ to $10_4$ carry out stream distribution for each session with full capacity with the maximum number of distribution streams "8". Therefore, if the cache server $10_1$ fails, the streaming data of all sessions can be distributed without interruption.

Example of Recovery Operation

In the states shown in FIG. 17, when the cache server $10_1$ is recovered, the operation of recovering the streaming data is performed based on the following first to sixth steps.

First step: The cache control unit $17_1$ of the cache server $10_1$ copies all streaming data stored in the streaming data storage units $15_2$ and $15_4$ of the cache servers $10_2$ and $10_4$ to the streaming data storage unit $15_1$.

Second step: Based on the information from the distribution-disabled detection units $13_2$ and $13_4$ of the cache server $10_2$ and $10_4$, the distribution-disabled detection unit $13_1$ registers the corresponding session identifiers and packet identifiers in the session management tables $53_1$ and $53_2$.

Third step: The recovery detection unit $18_1$ of the cache server $10_1$ sets the table boundary values $54_1$ and $54_2$ to "4".

Fourth step: The recovery detection unit $18_2$ of the cache server $10_2$ detects, based on the notification from the cache server $10_1$, that the table boundary value $54_2$ has been returned to its original value, and then sets the table boundary values $54_3$ and $54_4$ to "4".

Fifth step: The recovery detection unit $18_3$ of the cache server $10_3$ detects, based on the notification from the cache server $10_2$, that the table boundary value $54_4$ has been returned to its original value, and then sets the table boundary value $54_5$ to "4".

Sixth step: The recovery detection unit 184 of the cache server $10_4$ detects, based on the notification from the cache server $10_1$, that the table boundary value $54_1$ has been returned to its original value, and then sets the table boundary value $54_8$ to "4".

With the above-described operation, the states of the cache servers $10_1$ to $10_4$ are returned to the states as shown in FIG. 16. Therefore, if any one of the cache servers becomes unable to carry out distribution in the future, the fail-safe operation can be performed again.

As such, in the cluster server apparatus according to the embodiment of the present invention, one piece of streaming data is stored in a plurality of cache servers.

Thus, it is possible to directly distribute the streaming data from the plurality of cache servers, thereby achieving great improvement in distribution performance.

Further, the loads on the cache servers are equally distributed based on the streaming data stored therein, thereby allowing efficient management of storage units (caches) and data distribution to more terminals.

Still further, the streaming data is always stored in the plurality of cache servers, which are operated by communicating with each other with reference to the state of distribution of the plurality of cache servers. Thus, data distribution can be continued without interruption even if a failure of any one of the cache servers occurs.

Still further, since the streaming data is always stored in the plurality of cache servers, the quick recovery operation can be performed on the cache server that is recovered after it has failed. Also, with this recovery operation, the state of the cache server is returned to its original state before the failure occurred, thereby allowing continuation of distribution to the terminals without interruption even if the cache server again becomes unable to carry out data distribution.

Note that, in the above embodiment, a method is exemplarily described in which the cache servers $10_1$ to $10_n$ include the session management units $11_1$ to $11_n$ and the streaming data management units $14_1$ to $14_n$, respectively, and return the number of streams currently being distributed and the presence or absence of the data in response to the cluster control unit 21. However, other methods can be implemented. For instance, the cluster server apparatus 10 holds one database, where all cache servers $10_1$ to $10_n$ individually update the database, and the cluster control unit 21 refers to the database to recognize the number of streams currently being distributed and the presence or absence of the data.

Further, in the above embodiment, the load-distribution server 20 and the cache servers $10_1$ to $10_n$ are separately structured. Alternatively, any cache server $10_x$ may have the function of the load-distribution server 20. Still further, all cache servers $10_1$ to $10_n$ may alternatively have the function of the load-distribution server 20, and the cache server $10_x$ that actually received a request may operate as the load-distribution server.

Still further, in the above embodiment, the maximum number of distribution streams for one cache server is MAX and, with reference thereto, the number of distribution streams that can be distributed is determined. However, if the maximum number of distribution streams cannot be uniquely determined because of the difference in performance of the cache servers, the maximum number of distributable streams may be determined in accordance with the cache server having the lowest performance or the average performance among the cache servers. Alternatively, the maximum number of distribution streams may be set to be smaller in advance than the actual maximum number of distribution streams.

While the invention has been described in detail, the foregoing description is in all aspects illustrative and not restrictive. It is understood that numerous other modifications and variations can be devised without departing from the scope of the invention.

What is claimed is:

1. A cluster server apparatus for distributing streaming data continuously in time in response to requests from a plurality of terminals which are connected to said cluster server apparatus through a network, said cluster server apparatus comprising:

first to n-th cache servers, where n is an integer greater than or equal to two, said first to n-th cache servers each being operable to distribute streaming data to the terminals corresponding to the requests from the terminals;

a load-distribution server operable to receive a request sent from one of the terminals, and to transfer the request to one of said first to n-th cache servers based on whether streaming data corresponding to the request is stored in said first to n-th cache servers or not and states of streaming data distribution of each of said first to n-th cache servers; and a content server having a storage unit operable to store the streaming data, said content server being operable to output, to one of said first to n-th cache servers, the streaming data corresponding to a request for streaming data distribution from one of said first to n-th cache servers; and each of said first to n-th cache servers comprising:

a streaming data storage unit operable to store the streaming data output from said content server;

a request transfer unit operable to receive the request transferred from said load-distribution server, wherein when the streaming data corresponding to the request is stored in said streaming data storage unit, said request transfer unit is operable to output an instruction for distributing the streaming data stored in said streaming data storage unit, and when the streaming data corresponding to the request is not stored in said streaming data storage unit, said request transfer unit is operable to transfer the request to said content server to thereby retrieve the streaming data corresponding to the request, to store the streaming data retrieved from said content server in said streaming data storage unit, and to output the instruction for distributing the streaming data stored in said streaming data storage unit;

a data distribution unit operable to distribute the streaming data stored in said streaming data storage unit to the one of the terminals which sent the request based on the instruction output from said request transfer unit; and a cache control unit operable to control the streaming data output from said content server to be redundantly stored in said streaming data storage unit of at least one other predetermined cache server among said first to n-th cache servers, wherein when the streaming data is stored in said streaming data storage unit of an i-th cache server, where i is an integer greater than or equal to one and less than n, said cache control unit of said i-th cache server is operable to control the streaming data to be redundantly stored in said streaming data storage unit of an (i+1)-th cache server, and when the streaming data is stored in said streaming data storage unit of said n-th cache server, said cache control unit of said n-th cache server is operable to control the streaming data to be redundantly stored in said streaming data storage unit of said first cache server.

2. The cluster server apparatus according to claim 1, wherein when the streaming data corresponding to the request is not stored in said streaming data storage unit of one of said first to n-th cache servers, said cache control unit of said one of said first to n-th cache servers is operable to change a sender address of the request to be transferred to said content server into a predetermined multicast address for transmission to said content server, and when said cache control unit of said one of said first to n-th cache servers receives the streaming data destined for the predetermined multicast address, said cache control unit of said one of said first to n-th cache servers is operable to control the streaming data to be stored in said streaming data storage unit of said one of said first to n-th cache servers.

3. The cluster server apparatus according to claim 1, wherein when the streaming data corresponding to the request is not stored in said streaming data storage unit of said i-th cache server, said cache control unit of said i-th cache server is operable to transmit, to said content server, the request for streaming data distribution to addresses of said i-th cache server and said (i+1)-th cache server.

4. The cluster server apparatus according to claim 1, wherein said load-distribution server is operable to transfer the requests to said first to n-th cache servers so that a number of distributable streams for each of said first to n-th cache servers is less than or equal to a value $(n-1)/n \times MAX$, where MAX is a maximum number of distribution streams that each of said first to n-th cache servers are operable to distribute, and a total number of distribution streams of the streaming data stored in said streaming data storage units of said i-th cache server and said (i+1)-th cache server is equal to or less than MAX.

5. The cluster server apparatus according to claim 1, wherein said load-distribution unit is operable to transfer the requests to said first to n-th cache servers so that the total number of distribution streams of the streaming data stored in said streaming data storage units of said i-th cache server and said (i+1)-th cache server is equal to or less than MAX, where MAX is a maximum number of distribution streams that each of said cache servers can distribute, and a total number of distribution streams of the streaming data stored in said streaming data storage units of an (i−1)-th cache server and said i-th cache server is equal to or less than MAX.

6. The cluster server apparatus according to claim 1, wherein
said data distribution unit of said i-th cache server is operable to notify said (i+1)-th cache server and said (i−1)-th cache server that redundantly store the streaming data stored in said i-th cache server of distribution information of said i-th cache server at regular intervals, the distribution information corresponding to the streaming data being distributed by said i-th cache server to the one of the terminals which sent the request, and
said i-th cache server further comprises a distribution-disabled detection unit operable to detect, through a distribution information received from said (i+1)-th cache server and said (i−1)-th cache server, whether either one or both of said (i+1)-th cache server and (i−1)-th cache server become unable to carry out distribution of the streaming data, and to provide an instruction to said data distribution unit of said i-th cache server to instead distribute, within a predetermined period for avoiding interruption of distribution of the streaming data, streaming data that succeeds the streaming data most recently distributed by either or both of said (i+1) cache server and said (i−1)-th cache sever when either or both of said (i+1) cache server and said (i−1)-th cache sever become unable to carry out distribution of the streaming data.

7. The cluster server apparatus according to claim 6, wherein when said data distribution unit of said i-th cache server distributes, instead of either of said (i+1)-th cache server and said (i−1)-th cache server either or both of said (i+1) cache server and said (i−1)-th cache sever become unable to carry out the distribution of the streaming data, the streaming data to the one of the terminals which sent the request of the streaming data by following the instruction provided by said distribution-disabled detection unit of said i-th cache server,
said cache control unit of said i-th cache server is operable to control new streaming data from being stored in said streaming data storage unit of said i-th cache server.

8. The cluster server apparatus according to claim 6, wherein
when one of said first-to-nth cache servers which became unable to carry out the distribution of the streaming data recovers from being unable to carry out the distribution of the streaming data,
said one of said first-to-nth cache servers which recovered is operable to output a recovery notification to said data distribution unit of another one of said first-to-nth cache servers which redundantly stored the streaming data stored in said streaming data storage unit of said one of said first to n-th cache servers, and
when receiving the recovery notification from said one of said first to n-th cache servers, said another one of said first to n-th cache servers, which distributed the streaming data to the one of the terminals which sent the request instead of said one of said first to n-th cache servers when said one of said first to n-th cache servers became unable to carry out the distribution of the streaming data, is operable to copy the streaming data stored in said streaming data storage unit of said another one of said first to n-th cache servers to said streaming data storage unit of said one of said first to n-th cache servers.

9. The cluster server apparatus according to claim 8, wherein
each of said first to n-th cache servers further comprises a recovery detection unit operable to detect whether said one of said first to n-th cache severs which became unable to carry out distribution of the streaming data recovers from being unable to carry out distribution of the streaming data,
when said one of said first to n-th cache servers recovers from being unable to carry out distribution of the streaming data, said recovery detection unit of said one of said first to n-th cache servers is operable to provide a recovery notification to said another one of said first to n-th cache servers, and to instruct said data distribution unit of said one of said first to n-th cache servers to instead distribute the streaming data that succeeds the streaming data that has been distributed by said another one of said first to n-th cache servers, and
said recovery detection unit of said another one of said first to n-th cache servers is operable to instruct said data distribution unit of said another one of said first to n-th cache servers to stop the distribution of the streaming data that has been distributed by said another one of said first to n-th cache servers instead of said one of said first to n-th cache servers when said one of said first to n-th cache servers became unable to carry out the distribution of the streaming data.

10. The cluster server apparatus according to claim 9, wherein
when said another one of said first to n-th cache servers that is carrying out distribution of the streaming data exceeds the maximum number of distribution streams which said another one of said cache servers is operable to distribute,
said recovery detection unit of said another one of said first to n-th cache servers is operable to instruct said data distribution unit of said another one of said first to n-th cache servers to stop distribution of the streaming data that has been distributed by said another one of said first to n-th cache servers instead of by said one of said first to n-th cache servers when said one of said first to n-th cache servers became unable to carry out distribution of the streaming data, and to instruct said data distribution unit of a still another one of said first to n-th cache servers to distribute the streaming data that succeeds the streaming data that has been distributed by said another one of said first to n-th cache servers, and
when said one of said first to n-th cache servers recovers from being unable to carry out the distribution of the streaming data, said recovery detection unit of said another one of said first to n-th cache servers is operable to provide the recovery notification to said still another one of said first to n-th cache servers, and said recovery detection unit of said still another one of said first to n-th cache servers is operable to instruct said data distribution unit of said still another one of said first to n-th cache servers to stop distributing the streaming data that has been distributed by said still another one of said first to n-th cache servers instead of said another one of said first to n-th cache servers.

11. The cluster server apparatus according to claim 1, wherein each of said first to n-th cache servers further comprises:

a session management unit operable to manage a session, which indicates an execution of distributing the streaming data to the one of the terminals which sent the request through the network, a packet most recently transmitted by said data distribution unit in each session, and a number of distribution streams of the streaming data; and a distribution-disabled detection unit operable to regularly transmit to and receive from said at least one other predetermined cache server among said first to n-th cache servers which redundantly stores the streaming data stored in said streaming data storage unit of said cache server a notification corresponding to packets for all sessions managed by said session management unit, and when one of said first to n-th cache servers ceases to send the notification for a predetermined time period, said distribution-disabled detection unit of said cache server is operable to determine that said one of said first to n-th cache servers which ceased to send the notification becomes unable to carry out distribution of the streaming data, and to provide an instruction to said data distribution unit of another one of said first to n-th cache servers that redundantly stores the streaming data stored in said one of said first to n-th cache servers, to instead distribute, within a predetermined period for avoiding an interruption of the distribution of the streaming data, a packet that succeeds the packet identified by the notification most recently received for sessions of the redundantly-stored streaming data among sessions managed by said one of said first to n-th cache servers which became unable to carry out the distribution of the streaming data.

12. The cluster server apparatus according to claim 11, wherein when said one of said first to n-th cache servers becomes unable to carry out the distribution of the streaming data and a response from said session management unit of said cache server shows that a number of distribution streams exceeds a maximum number of distribution streams that said cache server is operable to distribute, said distribution-disabled detection unit of said another one of said first to n-th cache servers is operable to provide an overflow notification to still another one of said first to n-th cache servers that redundantly stores the streaming data stored in said streaming data storage unit of said one of said first to n-th cache severs and said streaming data storage unit of said another one of said first to n-th cache servers, and to instruct said data distribution unit of said another one of said first to n-th cache servers to stop distributing streaming data exceeding the maximum number of distribution streams, and said distribution-disabled detection unit of said still another one of said first to n-th cache servers is operable to receive the overflow notification from one of said first to n-th cache servers, and upon receipt of the overflow notification, to instruct said data distribution unit of said still another one of said first to n-th cache servers to distribute a packet that succeeds the packet identified by a notification most recently received for streaming data exceeding the maximum number of distribution streams of which said another one of said first to n-th cache servers stops distributing.

13. The cluster server apparatus according to claim 11, wherein each of said first to n-th cache servers further comprises a distribution recovery unit operable to detect whether or not said one of said first to n-th cache servers recovers from being unable to carry out the distribution of the streaming data, when said one of said first to n-th cache servers recovers from being unable to carry out the distribution of the streaming data, said cache control unit of said one of said first to n-th cache servers is operable to provide a recovery notification to said data distribution unit of another one of said cache first to n-th cache servers that redundantly stores the streaming data stored in said streaming data storage unit of said one of said first to n-th cache servers, and to copy the streaming data stored in said streaming data storage unit of said another one of said first to n-th cache servers to said streaming data storage unit of said one of said first to n-th cache servers, and wherein, after said cache control unit of said one of said first to n-th cache servers completes the copy of the streaming data to said streaming data storage unit of said one of said first to n-th cache servers, said recovery detection unit of said one of said first to n-th cache servers is operable to provide a recovery notification to said another one of said first to n-th cache servers, and to instruct said data distribution unit of said one of said first to n-th cache servers to start distributing a packet that succeeds the packet identified by a packet identifier most recently transmitted in the streaming data that has been distributed instead by said another one of said first to n-th cache servers when said one of said first to n-th cache servers became unable to carry out the distribution of the streaming data, and said recovery detection unit of said another one of said first to n-th cache servers is operable to instruct said data distribution unit of said another one of said first to n-th cache servers to stop distribution of the streaming data that has been distributed said another one of said first to n-th cache servers instead of by said one of said first to n-th cache servers when said one of said first to n-th cache servers became unable to carry out the distribution of the streaming data.

14. The cluster server apparatus according to claim 13, wherein when said another one of said first to n-th cache servers carrying out the distribution of streaming data instead of said one of said first to n-th cache servers exceeds a maximum number of distribution streams which said another one of said first to n-th cache servers is operable to distribute, said recovery detection unit of said another one of said first to n-th cache servers is operable to instruct said data distribution unit of said another one of said first to n-th cache servers to stop distribution of the streaming data that has been distributed by said another one of said first to n-th cache servers instead of by said one of said first to n-th cache servers when said one of said first to n-th cache servers became unable to carry out the distribution of the streaming data, and to instruct said data distribution unit of a still another one of said first to n-th cache servers to distribute the streaming data that succeeds the streaming data that has been distributed by said another one of said first to n-th cache servers before said recovery detection unit of said another one of said first to n-th cache servers instructed said data distribution unit of said another one of said first to n-th cache servers to stop distribution of the streaming data; and when said one of said first to n-th cache servers recovers from being unable to carry out the distribution of the streaming data, said recovery detection unit of said another one of said first to n-th cache servers is operable to provide the recovery notification to said still another one of said first to n-th cache servers, and to instruct said data distribution unit of said one of said first to n-th cache servers to start distributing the packet that succeeds the packet identified by the packet identifier most recently transmitted in the streaming data that has been distributed by said still another one of said first to n-th cache servers, and said recovery detection unit of said still another one of said first to n-th cache servers is operable to instruct said data distribution unit of said still another one of said first to n-th cache servers to stop the distribution of the streaming data that has been distributed by said still another one of said first to n-th cache servers instead of said another one of said first to n-th cache servers.

15. The cluster server apparatus according to claim 1, wherein each of said first to n-th cache servers further comprises:

a session management unit operable to manage a session identifier for identifying a session, which indicates an execution of distributing the streaming data to the one of the terminals which sent the request through the network, a packet identifier for identifying a packet most recently transmitted by said data distribution unit for each session, a session management table for storing said session identifier and said packet identifier, a table boundary value for dividing the session management table into two based on said session identifier, and a number of distribution streams of the streaming data; and a distribution-disabled detection unit operable to regularly transmit to and receive from said at least one other predetermined cache server which redundantly stores the streaming data stored in said streaming data storage unit of one of said first to n-th cache servers a notification corresponding to session identifiers and packet identifiers for all of the sessions in which the streaming data managed by said session management unit of said one of said first to n-th cache servers are being distributed, and to update, according to the notification received by said at least one other predetermined cache server, said session identifier and said packet identifier stored in the session management table, wherein said session management unit is operable to set said session identifier of the session for the streaming data being distributed by said data distribution unit of said cache server to a value smaller than or equal to the table boundary value, and to set said session identifier of the session for the streaming data being distributed by said data distribution units of said first to n-th cache servers other than said cache server to a value larger than the table boundary value, said data distribution unit of said cache server is operable to repeatedly distribute the packet to the one of the terminals which sent the request and to update said packet identifier when said session identifier is smaller than or equal to the table boundary value in all of the sessions, and when one of said first to n-th cache servers ceases to send the notification for a predetermined time period, said distribution-disabled detection unit of said cache server is operable to determine that said one of said first to n-th cache servers which ceased to send the notification becomes unable to carry out distribution of the streaming data, and to set the table boundary value to a value larger than a maximum value of said session identifier within a predetermined period for avoiding an interruption of the distribution of the streaming data.

16. The cluster server apparatus according to claim 15, wherein each of said at least one other predetermined cache server among said first to n-th cache servers which redundantly stores the streaming data stored in said streaming data storage unit of said cache server includes a session management table in which a maximum number of registerable sessions is MAX, where MAX is a maximum number of distribution streams that each of said at least one other predetermined cache server among said first to n-th cache servers is operable to distribute, each of said session management units of each of said first to n-th cache servers is operable to set its respective session identifier to a value smaller than the table boundary value for the session of the streaming data being distributed by its respective data distribution unit, and to set said session identifier of each other one of said first to n-th cache servers to a value larger than the table boundary value for the session of the streaming data being distributed by said data distribution unit of said each other one of said first to n-th cache servers, wherein each of said session management units of each of said first to n-th cache servers sets respective session identifiers I1-In that are smaller than the table boundary value in the session management table in said each other one of said first to n-th cache servers to values of (MAX-I1 −1) to (MAX-In −1), respectively, so as to set said session identifiers I1-In to a value larger than the table boundary value for the session of the streaming data being distributed by said data distribution unit of said each other one of said first to n-th cache servers, and said distribution-disabled unit of each of said first to n-th cache servers is operable to update, according to the notification received by said each other one of said first to n-th cache servers, values in the session management table to the values (MAX-I1−1) to (MAX-In−1) of said session identifiers included in the notification and values of packet identifiers P1 to Pn, and when the table boundary value is changed to F, to set the table boundary value to MAX-F.

17. The cluster server apparatus according to claim 16, wherein said each of said first to n-th cache servers further comprises a distribution recovery unit operable to detect whether said one of said first to n-th cache servers which has become unable to carry out the distribution of the streaming data recovers from being unable to carry out the distribution of the streaming data;

wherein when said one of said first to n-th cache servers recovers from being unable to carry out the distribution of the streaming data, said cache control unit of said one of said first to n-th cache servers is operable to provide a recovery notification to said data distribution unit of said at least one other predetermined cache server among said first to n-th cache servers that redundantly stores the streaming data stored in said streaming data storage unit of said one of said first to n-th cache servers, and to copy the streaming data stored in said streaming data storage unit of said at least one other predetermined cache server among said first to n-th cache servers, which instead distributed the streaming data to the one of the terminals which sent the request when said one of said first to n-th cache servers became unable to carry out distribution of the streaming data, to said streaming data storage unit of said one of said first to n-th cache servers which has recovered; and wherein when said cache control unit of said one of said first to n-th cache servers completes the copy of the streaming data, said recovery detection unit of said one of said first to n-th cache servers is operable to provide a recovery notification to said at least one other predetermined cache server among said first to n-th cache servers, and to set the table boundary value of said one of said first to n-th cache servers back to a value which existed before said one of said first to n-th cache servers became unable to carry out the distribution of the streaming data, and said recovery detection unit of said at least one other predetermined cache server among said first to n-th cache servers is operable to set the table boundary value back to a value of the table boundary value of said at least one other predetermined cache server among said first to n-th cache servers which existed before said one of said first to n-th cache servers became unable to carry out distribution.

18. The cluster server apparatus according to claim 15, wherein when a streaming data set S1 stored in both a cache server A and a cache server B among said first to n-th cache servers and a streaming data set S2 stored in both said cache server A and a cache server C among said first to n-th cache servers are stored in said streaming data storage unit of said cache server A, said cache server A has session management tables T0 and T1 and table boundary values F0 and F1 at which the session management tables T0 and T1 are divided into two based on said session identifier of said cache server A, wherein in said session management table T0, said session identifier is set to a value smaller than the table boundary value F0 for the session of the streaming data included in the streaming data set S1 being distributed by said cache server A, while said session identifier is set to a value larger than the table boundary value F1 for the session of the streaming data included in the streaming data set S1 being distributed by said cache server B, wherein said session management unit of said 1463 cache server A sets session identifiers I1-In that are smaller than the table boundary value F1 to one of values (MAX-I1-1) to (MAX-In-1), respectively, where MAX is the maximum number of distribution streams that each of said cache servers A to C is operable to distribute, in said session management table of said cache server B so as to set said I1-In session identifiers to a value larger than the table value boundary value F1 for the session of the streaming data set S1 being distributed by said cache server B, in said session management table T1, said session identifier is set to a value smaller than the table boundary value F1 for the session of the streaming data included in the streaming data set S2 being distributed by said cache server A, while said session identifier is set to a value larger than the table boundary value F0 for the session of the streaming data included in the streaming data set S2 being distributed by said cache server C, wherein said session management unit of said cache server A sets session identifiers J1-Jn that are smaller than the table value boundary value F1 to one of values (MAX-J1-1) to (MAX-Jn-1), respectively, in said management unit table of said cache server C so as to set said J1-Jn session identifiers to a value larger than the table boundary value F1 for the session of the streaming data set S2 being distributed by said cache server C, wherein in said cache server A, said distribution-disabled detection unit is operable to:

transmit a notification indicating said session identifier and said packet identifier for all sessions of the streaming data being distributed to said cache servers B and C by making an inquiry to said session management unit of said cache servers B and said session management unit of said cache server C, and receive the notification from said cache servers B and C;

set the table boundary value F0 to a value equal to or larger than MAX when no notification comes from said cache server B, and set the table boundary value F1 to a value equal to or larger than MAX when no notification comes from said cache server C;

when the number of distribution streams exceeds the maximum number of distribution streams, set the table boundary value F1 to a value smaller than the maximum number of distribution streams if no notification comes from said cache server B, and set the table boundary value F0 to a value smaller than the maximum number of distribution streams if the notification comes from said cache server C.

19. The cluster server apparatus according to claim 18, wherein each of said first to n-th cache servers further comprises a distribution recovery unit operable to detect whether said one of said first to n-th cache servers which has become unable to carry out distribution of the streaming data recovers from being unable to carry out distribution of the streaming data;

wherein when said one of said first to n-th cache servers recovers from being unable to carry out distribution of the streaming data, said cache control unit of said one of said first to n-th cache servers is operable to provide a recovery notification to said data distribution unit of said cache server A, which redundantly stores the streaming data stored in said streaming data storage unit of said one of said first to n-th cache servers, and to copy the streaming data stored in said streaming data storage unit of said cache server A, which instead distributed the streaming data to the one of the terminals which sent the request when said one of said first to n-th cache servers became unable to carry out distribution of the streaming data, to said streaming data storage unit of said one of said first to nth cache servers;

wherein when said cache control unit of said one of said first to n-th cache servers completes the copy of the streaming data by providing a recovery notification to said cache server A, said recovery detection unit of said one of said first to n-th cache servers is operable to set the table boundary value of said one of said first to n-th cache servers back to a value which existed before said one of said first to n-th cache servers became unable to carry out the distribution of the streaming data; and wherein when the table boundary value of said one of said first to n-th cache servers is set to the value which existed before said one of said first to n-th cache servers became unable to carry out the distribution of the streaming data, said recovery detection unit of said cache server A is operable to set the table boundary values F0 and F1 back to values which existed before said one of said first to n-th cache servers became unable to carry out the distribution.

20. The cluster server apparatus according to claim 1, wherein each of said first to n-th cache servers further comprises:

a session management unit operable to manage a number of distribution streams of the streaming data distributed by said data distribution unit; and a distribution-disabled detection unit operable to detect whether one of said first to n-th cache servers becomes unable to carry out distribution of the streaming data, and to instruct said data distribution unit to instead distribute the streaming data that succeeds the streaming data most recently distributed by said one of said first to n-th cache servers before said one of said first to n-th cache servers became unable to carry out the distribution of the streaming data; wherein said distribution-disabled detection unit is operable to provide an overflow notification to another one of said first to n-th cache servers that redundantly stores the streaming data stored in said streaming data storage unit of said cache server and streaming data storage unit of said one of said first to n-th cache servers, and to instruct said data distribution unit to stop distributing streaming data that exceeds a maximum number of permissible distribution streams, and upon receiving the overflow notification from said distribution-disabled detection unit of said cache server, said distribution-disabled detection unit of said another one of said first to n-th cache servers is operable to instruct said data distribution unit of said another one of said first to n-th cache servers to transmit streaming data that succeeds the streaming data most recently distributed by said cache server for all streaming data that exceeds the maximum number of permissible distribution streams that said cache server stopped distributing.

21. The cluster server apparatus according to claim 1, wherein the streaming data is moving-picture data.

22. The cluster server apparatus according to claim 1, wherein said (i+1)-th cache server is an adjacent cache server to said i-th cache server, and said n-th cache server is an adjacent cache server to said first cache server.

23. A cluster server apparatus for distributing streaming data continuously in time in response to requests from a plurality of terminals connected to said cluster server apparatus through a network, said cluster server apparatus comprising:

a plurality of cache servers each operable to distribute the streaming data to the terminals corresponding to the requests from the terminals;

a load-distribution server operable to receive a request sent from one of the terminals, and to transfer the request to one of said plurality of cache servers based on whether the streaming data corresponding to the request is stored in said cache servers or not and states of streaming data distribution of each of said plurality of cache servers;

a content server having a storage unit operable to store the streaming data, said content server operable to output, to one of said plurality of cache servers, the streaming data corresponding to a request for streaming data distribution from one of said plurality of cache servers; and each of said cache servers comprising:

a streaming data storage unit operable to store the streaming data output from said content server;

a cache control unit operable to control the streaming data output from said content server to be redundantly stored in said streaming data storage unit of at least one other predetermined cache server among said plurality of cache servers a request transfer unit operable to receive the request transferred from said load-distribution server, wherein when the streaming data corresponding to the request is stored in said streaming data storage unit, said request transfer unit is operable to output an instruction for distributing the streaming data stored in said streaming data storage unit, and when the streaming data corresponding to the request is not stored in said streaming data storage unit, said request transfer unit is operable to transfer the request to said content server to thereby retrieve the streaming data corresponding to the request, to store the streaming data retrieved from said content server in said streaming data storage unit, and to output the instruction for distributing the streaming data stored in said streaming data storage unit;

a data distribution unit operable to distribute the streaming data stored in said streaming data storage unit to the one of the terminals which sent the request based on the instruction output from said request transfer unit, and to notify, at regular intervals, said at least one other predetermined cache server among said plurality of cache servers, which redundantly stores the streaming data stored in said streaming data storage unit, of distribution information corresponding to the streaming data being distributed to the one of the terminals which sent the request; and a distribution-disabled detection unit operable to detect, through distribution information received from another cache server among said plurality of cache servers, whether said another cache server becomes unable to carry out distribution of the streaming data, and to provide an instruction to said data distribution unit to instead distribute, within a predetermined period of time for avoiding an interruption in the distribution of the streaming data, streaming data that succeeds the streaming data most recently distributed by said another cache server that has become unable to carry out the distribution of the streaming data.

24. The cluster server apparatus according to claim 23, wherein when said data distribution unit, by following the instruction provided by said distribution-disable detection unit, distributes the streaming data to the one of the terminals which sent the request instead of said another cache server that has become unable to carry out the distribution of the streaming data, said cache control unit is operable to control new streaming data from being stored in said streaming data storage unit.

25. The cluster server apparatus according to claim 23, wherein when said another cache server recovers from being unable to carry out the distribution of the streaming data, said another cache server is operable to output a recovery notification to said data distribution unit of said at least one predetermined cache server among said plurality of cache servers that has redundantly stored the streaming data stored in said another cache server, and when receiving the recovery notification, said at least one other predetermined other cache server among said plurality of cache servers that has distributed the streaming data to the one of the terminals instead of said another cache server when said another cache server became unable to carry out the distribution of the streaming data, to copy the streaming data stored in said streaming data storage unit of said at least one other predetermined other cache server to said streaming data storage unit of said another cache server.

26. The cluster server apparatus according to claim 25, wherein each of said plurality of cache servers further comprises a recovery detection unit operable to detect whether said another cache server recovers from being unable to carry out the distribution of the streaming data, when said another cache server recovers from being unable to carry out the distribution of the streaming data, said recovery detection unit of said another cache server provides a recovery notification to said at least one other predetermined cache server that takes over distribution of the streaming data to said terminal instead of said another cache server when said another cache server becomes unable to carry out the distribution of the streaming data, and to instruct said data distribution unit of said another cache server to distribute the streaming data that succeeds the streaming data that has been distributed by said at least one other predetermined cache server, and said recovery detection unit of at least one other predetermined cache server is operable to instruct said data distribution unit of said at least one other predetermined cache server to stop the distribution of the streaming data that has been distributed by said at least one other predetermined cache server instead of by said another cache server when said another cache server became unable to carry out the distribution of the streaming data.

27. The cluster server apparatus according to claim 26, wherein when said at least one other predetermined cache server carries out distribution of streaming data exceeds a maximum number of distribution streams which said at least one other predetermined cache server is operable to distribute because of distributing the streaming data instead of said another cache server which became unable to carry out distribution of the streaming data, said recovery detection unit of said at least one other predetermined cache server is operable to instruct said data distribution unit of said at least one other predetermined cache server to stop distribution of the streaming data that has been distributed thereby instead of by said another cache server, and to instruct said data distribution unit of a still another cache server to start distributing streaming data that succeeds the streaming data that has been distributed by said at least one other predetermined cache server, and when said another cache server recovers from being unable to carry out the distribution of the streaming data, said recovery detection unit of said at least one other predetermined cache server is operable to provide the recovery notification to said still another cache server, and said recovery detection unit of said still another cache server instructs said data distribution unit of said still another cache server to stop distributing the streaming data that has been distributed by said still another cache server instead of by said at least one other predetermined cache server.

28. The cluster server apparatus according to claim 23, wherein the streaming data is moving-picture data.

29. A cluster server apparatus for distributing streaming data continuously in time in response to requests from a plurality of terminals connected to said cluster server apparatus through a network, said cluster server apparatus comprising:

a plurality of cache servers each operable to distribute the streaming data to the terminals corresponding to the requests from the terminals;

a load-distribution server operable to receive a request from one of the terminals, and to transfer the request to one of said plurality of cache servers based on whether the streaming data corresponding to the request is stored in said cache servers or not and states of streaming data distribution of each of said plurality of cache servers;

a content server having a storage unit operable to store the streaming data, said content server operable to output, to one of said plurality of cache servers, the streaming data corresponding to a request for streaming data distribution from one of said plurality of cache servers; and each of said cache servers comprising:

a streaming data storage unit operable to store the streaming data output from said content server;

a cache control unit operable to control the streaming data output from said content server to be redundantly stored in said streaming data storage unit of at least one other predetermined cache server among said plurality of cache servers a request transfer unit operable to receive the request transferred from said load-distribution server, wherein when the streaming data corresponding to the request is stored in said streaming data storage unit, said request transfer unit is operable to output an instruction for distributing the streaming data stored in said streaming data storage unit, and when the streaming data corresponding to the request is not stored in said streaming data storage unit, said request transfer unit is operable to transfer the request to said content server to thereby retrieve the streaming data corresponding to the request, to store the streaming data retrieved from said content server in said streaming data storage unit, and to output the instruction for distributing the streaming data stored in said streaming data storage unit;

a data distribution unit operable to distribute the streaming data stored in said streaming data storage unit to the one of the terminals which sent the request based on the instruction output from said request transfer unit;

a session management unit operable to manage a session, which indicates an execution of distributing the streaming data to the one of the terminals which sent the request through the network, a packet most recently transmitted by said data distribution unit in each session, and a number of distribution streams of the streaming data; and a distribution-disabled detection unit operable to regularly transmit to and receive from said at least one other predetermined cache server among said plurality of cache servers which redundantly stores the streaming data stored in said streaming data storage unit of said cache server a notification corresponding to packets for all sessions managed by said session management unit, wherein when one of said plurality of cache servers ceases to send the notification for a predetermined time period, said distribution-disabled detection unit of said cache server is operable to determine that said one of said plurality of cache servers which ceased to send the notification becomes unable to carry out distribution of the streaming data, and to provide an instruction to said data distribution unit of said cache server, which redundantly stores the streaming data stored in said one of said plurality of cache servers, to instead distribute, within a predetermined period for avoiding an interruption of the distribution of the streaming data, a packet that succeeds the packet identified by the notification most recently received for sessions of the redundantly-stored streaming data among sessions managed by said one of said plurality of cache servers which became unable to carry out the distribution of the streaming data.

30. The cluster server apparatus according to claim 29, wherein when said one of said plurality cache servers becomes unable to carry out the distribution of the streaming data and a response from said session management unit of said cache server shows that a number of distribution streams exceeds a maximum number of distribution streams that said cache server is operable to distribute, said distribution-disabled detection unit of said cache server is operable to provide an overflow notification to another one of said plurality of cache servers that redundantly stores the streaming data stored in said streaming data storage unit of said one of said plurality of cache severs and said streaming data storage unit of said cache server, and to instruct said data distribution unit of said cache server to stop distributing streaming data exceeding the maximum number of distribution streams, and said distribution-disabled detection unit of said another one of said plurality of cache servers is operable to receive the overflow notification from said cache server, and upon receipt of the overflow notification, to instruct said data distribution unit of said another one of said plurality of cache servers to distribute a packet that succeeds the packet identified by a notification most recently received for streaming data exceeding the maximum number of distribution streams of which said cache server that has provided the overflow notification stops distributing.

31. The cluster server apparatus according to claim 29, wherein each of said plurality of cache servers further comprises a distribution recovery unit operable to detect whether or not said one of said plurality of cache servers recovers from being unable to carry out the distribution of the streaming data, when said one of said plurality of cache servers recovers from being unable to carry out the distribution of the streaming data, said cache control unit of said one of said plurality of cache servers is operable to provide a recovery notification to said data distribution unit of said cache server that redundantly stores the streaming data stored in said streaming data storage unit of said one of said plurality of cache servers, and to copy the streaming data stored in said streaming data storage unit of said cache server to said streaming data storage unit of said one of said plurality of cache servers, and wherein, after said cache control unit of said one of said plurality of cache servers completes the copy of the streaming data to said streaming data storage unit of said one of said plurality of cache servers, said recovery detection unit of said one of said plurality of cache servers is operable to provide a recovery notification to said cache server, and to instruct said data distribution unit of said one of said plurality of cache servers to start distributing a packet that succeeds the packet identified by a packet identifier most recently transmitted in the streaming data that has been distributed instead by said cache server when said one of said plurality of cache servers became unable to carry out the distribution of the streaming data, and said recovery detection unit of said cache server is operable to instruct said data distribution unit of said cache server to stop distribution of the streaming data that has been distributed by said cache server instead of by said one of said plurality of cache servers when said one of said plurality of cache servers became unable to carry out the distribution of the streaming data.

32. The cluster server apparatus according to claim 31, wherein when said cache server carrying out the distribution of streaming data instead of said one of said plurality of cache servers exceeds a maximum number of distribution streams which said cache server is operable to distribute, said recovery detection unit of said cache server is operable to instruct said data distribution unit of said cache server to stop distribution of the streaming data that has been distributed by said cache server instead of by said one of said plurality of cache servers when said one of said plurality of cache servers became unable to carry out the distribution of the streaming data, and to instruct said data distribution unit of said another one of said plurality of cache servers to distribute the streaming data that succeeds the streaming data that has been distributed by said cache server before said recovery detection unit of said cache server instructed said data distribution unit of said cache server to stop distribution of the streaming data; and when said one of said plurality of cache servers recovers from being unable to carry out the distribution of the streaming data, said recovery detection unit of said cache server is operable to provide the recovery notification to said another one of said plurality of cache servers, and to instruct said data distribution unit of said one of said plurality of cache servers to start distributing the packet that succeeds the packet identified by the packet identifier most recently transmitted in the streaming data that have been distributed by said another one of said plurality of cache servers, and said recovery detection unit of said another one of said plurality of cache servers is operable to instruct said data distribution unit of said another one of said plurality of cache servers to stop the distribution of the streaming data that has been distributed by said another one of said plurality of cache servers instead of said cache server that has provided the recovery notification.

33. The cluster server apparatus according to claim 29, wherein the streaming data is moving-picture data.

34. A cluster server apparatus for distributing streaming data continuously in time in response to requests from a plurality of terminals connected to said cluster server apparatus through a network, said cluster server apparatus comprising:

a plurality of cache servers each operable to distribute the streaming data to the terminals corresponding to the requests from the terminals;

a load-distribution server operable to receive a request from one of the terminals, and to transfer the request to one of said plurality of cache servers based on whether the streaming data corresponding to the request is stored in said cache servers or not and states of streaming data distribution of each of said plurality of cache servers;

a content server having a storage unit operable to store the streaming data, said content server operable to output, to one of said plurality of cache servers, the streaming data corresponding to a request for streaming data distribution from one of said plurality of cache servers; and each of said cache servers comprising:

a streaming data storage unit operable to store the streaming data output from said content server;

a cache control unit operable to control the streaming data output from said content server to be redundantly stored in said streaming data storage unit of at least one other predetermined cache server among said plurality of cache servers a request transfer unit operable to receive the request transferred from said load-distribution server, wherein when the streaming data corresponding to the request is stored in said streaming data storage unit, said request transfer unit is operable to output an instruction for distributing the streaming data stored in said streaming data storage unit, and when the streaming data corresponding to the request is not stored in said streaming data storage unit, said request transfer unit is operable to transfer the request to said content server to thereby retrieve the streaming data corresponding to the request, to store the streaming data retrieved from said content server in said streaming data storage unit, and to output the instruction for distributing the streaming data stored in said streaming data storage unit;

a data distribution unit operable to distribute the streaming data stored in said streaming data storage unit to the one of the terminals which sent the request based on the instruction output from said request transfer unit;

a session management unit operable to manage a session identifier for identifying a session, which indicates an execution of distributing the streaming data to the terminal which sent the request through the network, a packet identifier for identifying a packet most recently transmitted by said data distribution unit for each session, a session management table for storing said session identifier and said packet identifier, a table boundary value for dividing the session management table into two based on said session identifier, and a number of distribution streams of the streaming data; and a distribution-disabled detection unit operable to regularly transmit to and receive from said at least one other predetermined cache server which redundantly stores the streaming data stored in said streaming data storage unit of one of said plurality of cache servers a notification corresponding to session identifiers and packet identifiers for all of the sessions in which the streaming data managed by said session management unit of said one of said plurality of cache servers are being distributed, and to update, according to the notification received by said at least one other predetermined cache server, said session identifier and said packet identifier stored in the session management table;

wherein said session management unit is operable to set said session identifier of the session for the streaming data being distributed by said data distribution unit of said cache server to a value smaller than or equal to the table boundary value, and to set said session identifier of the session for the streaming data being distributed by said data distribution units of said plurality of cache servers other than said cache server to a value larger than the table boundary value, said data distribution unit of said cache server is operable to repeatedly distribute the packet to the one of the terminals which sent the request and to update said packet identifier when said session identifier is smaller than or equal to the table boundary value in all of the sessions, and when one of said plurality of cache servers ceases to send the notification for a predetermined time period, said distribution-disabled detection unit of said cache server is operable to determine that said one of said plurality of cache servers which ceased to send the notification becomes unable to carry out distribution of the streaming data, and to set the table boundary value to a value larger than a maximum value of said session identifier within a predetermined period for avoiding an interruption of the distribution of the streaming data.

35. The cluster server apparatus according to claim 34, wherein each of said at least one other predetermined cache server among said plurality of cache servers which redundantly stores the streaming data stored in said streaming data storage unit of said cache server includes a session management table in which a maximum number of registerable sessions is MAX, where MAX is a maximum number of distribution streams that each of said at least one other predetermined cache server among said plurality of cache servers is operable to distribute, each of said session management units of each of said plurality of cache servers is operable to set its respective session identifier to a value smaller than the table boundary value for the session of the streaming data being distributed by its respective data distribution unit, and to set said session identifier of each other one of said plurality of cache servers to a value larger than the table boundary value for the session of the streaming data being distributed by said data distribution unit of said each other one of said plurality of cache servers, wherein each of said session management units of each of said plurality of cache servers sets respective session identifiers I1-In, where n is an integer greater than or equal to two, that are smaller than the table boundary value in the session management table in said each other one of said plurality of cache servers to values of (MAX-I1−1) to (MAX-In−1), respectively, so as to set said respective session identifiers I1-In to a value larger than the table boundary value for the session of the streaming data being distributed by said data distribution unit of said each other one of said plurality of cache servers, and said distribution-disabled unit of each of said plurality of cache servers is operable to update, according to the notification received by said each other one of said plurality of cache servers, values in the session management table to the values (MAX-I1−1) to (MAX-In−1) of said session identifiers included in the notification and values of packet identifiers P1 to Pn, and when the table boundary value is changed to F, to set the table boundary value to MAX-F.

36. The cluster server apparatus according to claim 35, wherein said each of said plurality of cache servers further comprises a distribution recovery unit operable to detect whether said one of said plurality of cache servers which has become unable to carry out distribution of the streaming data recovers from being unable to carry out the distribution of the streaming data;

wherein when said one of plurality of cache servers recovers from being unable to carry out the distribution of the streaming data, said cache control unit of said one of said plurality of cache servers is operable to provide a recovery notification to said data distribution unit of said at least one other predetermined cache server among said plurality of cache servers which redundantly stores the streaming data stored in said streaming data storage unit of said one of said plurality of cache servers, and to copy the streaming data stored in said streaming data storage unit of said at least one other predetermined cache server among said plurality of cache servers, which instead distributed the streaming data to the one of the terminals which sent the request when said one of said plurality of cache servers became unable to carry out distribution of the streaming data, to said streaming data storage unit of said one of said plurality of cache servers which has recovered; and wherein when said cache control unit of said one of said plurality of cache servers completes the copy of the streaming data, said recovery detection unit of said one of said plurality of cache servers is operable to provide a recovery notification to said at least one other predetermined cache server among said plurality of cache servers, and to set the table boundary value of said one of said plurality of cache servers back to a value before said one of said plurality of cache servers became unable to carry out the distribution of the streaming data, and said recovery detection unit of said at least one other predetermined cache server among said plurality of cache servers is operable to set the table boundary value back to a value of the table boundary value of said at least one other predetermined cache server among said plurality of cache servers before said one of said plurality of cache servers became unable to carry out distribution.

37. The cluster server apparatus according to claim 34, wherein when a streaming data set S1 stored in both a cache server A and a cache server B among said plurality of cache servers and a streaming data set S2 stored in both said cache server A and a cache server C among said plurality of cache servers are stored in said streaming data storage unit of said cache server A, said cache server A has session management tables T0 and T1 and table boundary values F0 and F1 at which the session management tables T0 and T1 are divided into two based on said session identifier of said cache server A, wherein in said session management table T0, said session identifier is set to a value smaller than the table boundary value F0 for the session of the streaming data included in the streaming data set S1 being distributed by said cache server A, while said session identifier is set to a value larger than the table boundary value F1 for the session of the streaming data included in the streaming data set S1 being distributed by said cache server B, wherein said session management unit of said cache server A sets session identifiers I1-In, where n is an integer greater than or equal to two, that are smaller than the table boundary value F1 to one of values (MAX-I1−1) to (MAX-In−1), respectively, where MAX is a maximum number of distribution streams that each of said cache servers A to C is operable to distribute, in said session management table of said cache server B, so as to set said I1-In session identifiers to a value larger than the table value boundary value F1 for the session of the streaming data set S1 being distributed by said cache server B, in said session management table T1, said session identifier is set to a value smaller than the table boundary value F1 for the session of the streaming data included in the streaming data set S2 being distributed by said cache server A, while said session identifier is set to a value larger than the table boundary value F0 for the session of the streaming data included in the streaming data set S2 being distributed by said cache server C, wherein said session management unit of said cache server A sets session identifiers J1-Jn that are smaller than the table value boundary value F1 to one of values (MAX-J1−1) to (MAX-Jn−1), respectively, in said management unit table of said cache server C so as to set said J1-Jn session identifiers to a value larger than the table boundary value F1 for the session of the streaming data set S2 being distributed by said cache server C;

wherein in said cache server A, said distribution-disabled detection unit is operable to:

transmit a notification indicating said session identifier and said packet identifier for all sessions of the streaming data being distributed to said cache servers B and C by making an inquiry to said session management unit of said cache servers B and said session management unit of said cache server C, and receive the notification from said cache servers B and C;

set the table boundary value F0 to a value equal to or larger than MAX when no notification comes from said cache server B, and set the table boundary value F1 to a value equal to or larger than MAX when no notification comes from said cache server C;

when the number of distribution streams exceeds the maximum number of distribution streams, set the table boundary value F1 to a value smaller than the maximum number of distribution streams if no notification comes from said cache server B, and set the table boundary value F0 to a value smaller than the maximum number of distribution streams if the notification comes from said cache server C.

38. The cluster server apparatus according to claim 37, wherein
each of said plurality of cache servers further comprises a distribution recovery unit operable to detect whether said one of said plurality of cache servers which has become unable to carry out distribution of the streaming data recovers from being unable to carry out distribution of the streaming data;
wherein when said one of said plurality of cache servers recovers from being unable to carry out distribution of the streaming data,
said cache control unit of said one of said plurality of cache server is operable to provide a recovery notification to said data distribution unit of said cache server A, which redundantly stores the streaming data stored in said streaming data storage unit of said one of said plurality of cache servers, and to copy the streaming data stored in said streaming data storage unit of said cache server A, which instead distributed the streaming data to the one of the terminals which sent the request when said one of said plurality of cache servers became unable to carry out distribution of the streaming data, to said streaming data storage unit of said one of said plurality of cache servers;
wherein when said cache control unit of said one of said plurality of cache servers completes the copy of the streaming data by providing a recovery notification to said cache server A, said recovery detection unit of said one of said plurality of cache servers is operable to set the table boundary value of said one of said plurality of cache servers back to a value which existed before said one of said plurality of cache servers became unable to carry out the distribution of the streaming data; and
wherein when the table boundary value of said one of said plurality of cache server is set to the value which existed before said one of said plurality of cache servers became unable to carry out the distribution of the streaming data, said recovery detection unit of said cache server A is operable to set the table boundary values F0 and F1 back to values which existed before said one of said plurality of cache servers became unable to carry out the distribution.

39. The cluster server apparatus according to claim 34, wherein the streaming data is moving-picture data.

40. A cluster server apparatus for distributing streaming data continuously in time in response to requests from a plurality of terminals connected to said cluster server apparatus through a network, said cluster server apparatus comprising:
a plurality of cache servers each operable to distribute the streaming data to the terminals corresponding to the requests from the terminals;
a load-distribution server operable to receive a request from one of the terminals, and to transfer the request to one of said plurality of cache servers based on whether the streaming data corresponding to the request is stored in said cache servers or not and states of streaming data distribution of each of said plurality of cache servers;
a content server having a storage unit operable to store the streaming data, said content server operable to output, to one of said plurality of cache servers, the streaming data corresponding to a request for streaming data distribution from one of said plurality of cache servers; and
each of said cache servers comprising:
a streaming data storage unit operable to store the streaming data output from said content server;
a cache control unit operable to control the streaming data output from said content server to be redundantly stored in said streaming data storage unit of at least one other predetermined cache server among said plurality of cache servers;
a request transfer unit operable to receive the request transferred from said load-distribution server, wherein
when the streaming data corresponding to the request is stored in said streaming data storage unit, said request transfer unit is operable to output an instruction for distributing the streaming data stored in said streaming data storage unit, and
when the streaming data corresponding to the request is not stored in said streaming data storage unit, said request transfer unit is operable to transfer the request to said content server to thereby retrieve the streaming data corresponding to the request, to store the streaming data retrieved from said content server in said streaming data storage unit, and to output the instruction for distributing the streaming data stored in said streaming data storage unit;
a data distribution unit operable to distribute the streaming data stored in said streaming data storage unit to the one of the terminals which sent the request based on the instruction output from said request transfer unit;
a session management unit operable to manage a number of distribution streams of the streaming data distributed by said data distribution unit; and
a distribution-disabled detection unit operable to
detect whether one of said plurality of cache servers becomes unable to carry out distribution of the streaming data,
instruct said data distribution unit to instead distribute the streaming data that succeeds the streaming data most recently distributed by said one of said plurality of cache servers before said one of said plurality of cache servers became unable to carry out the distribution of the streaming data,
provide an overflow notification to another one of said plurality of cache servers that redundantly stores the streaming data stored in said streaming data storage unit of said cache server and streaming data storage unit of said one of said plurality of cache servers, and
instruct said data distribution unit to stop distributing streaming data that exceeds a maximum number of permissible distribution streams that said cache server is operable to distribute;
wherein, upon receiving the overflow notification from said distribution-disabled detection unit of said cache server, said distribution-disabled detection unit of said another one of said plurality of cache servers is operable to instruct said data distribution unit of said another one of said plurality of cache servers to transmit streaming data that succeeds the streaming data most recently distributed by said cache server for all streaming data that exceeds the maximum number of permissible distribution streams that said cache server stopped distributing.

41. The cluster server apparatus according to claim 40, wherein the streaming data is moving-picture data.

* * * * *

UNITED STATES PATENT AND TRADEMARK OFFICE
CERTIFICATE OF CORRECTION

PATENT NO. : 6,760,765 B1
DATED : July 6, 2004
INVENTOR(S) : Rieko Asai et al.

It is certified that error appears in the above-identified patent and that said Letters Patent is hereby corrected as shown below:

Title page,
Item [56], References Cited, FOREIGN PATENT DOCUMENTS, please add
-- WO 99/18534     04/1999 --
OTHER PUBLICATIONS, please add the following:
-- Serpanos D N et al., MMPacking: A load and storage balancing algorithm for distributed multimedia servers, 10-1996, pp. 170-174
Kurcewicz M et al., A distributed WWW cache, 11-1998, vol. 30, no. 22-23, pp. 2261-2267
Dias G V et al., A Smart Internet Caching System, 06-1996
Dias D M et al., A scalable and highly available web server, 02-1996, pp. 85-92 --

Column 34,
Line 62, please replace "nth" with -- n-th --.

Column 35,
Line 17, please replace "manage-a" with -- manage a --.

Signed and Sealed this

Twenty-eighth Day of December, 2004

JON W. DUDAS
*Director of the United States Patent and Trademark Office*